(12) United States Patent
Sanchez

(10) Patent No.: US 11,615,103 B2
(45) Date of Patent: Mar. 28, 2023

(54) COGNITIVE PROCESS COMPOSITION

(71) Applicant: Cognitive Scale, Inc., Austin, TX (US)

(72) Inventor: Matthew Sanchez, Austin, TX (US)

(73) Assignee: Tecnotree Technologies, Inc., Lewes, DE (US)

(*) Notice: Subject to any disclaimer, the term of this patent is extended or adjusted under 35 U.S.C. 154(b) by 487 days.

(21) Appl. No.: 16/801,858

(22) Filed: Feb. 26, 2020

(65) Prior Publication Data

US 2020/0293948 A1    Sep. 17, 2020

Related U.S. Application Data

(60) Provisional application No. 62/819,092, filed on Mar. 15, 2019, provisional application No. 62/817,186, filed on Mar. 12, 2019.

(51) Int. Cl.
*G06F 16/2458* (2019.01)
*G06N 20/00* (2019.01)
(Continued)

(52) U.S. Cl.
CPC .... *G06F 16/2465* (2019.01); *G06F 16/24553* (2019.01); *G06F 40/30* (2020.01); *G06N 3/006* (2013.01); *G06N 5/02* (2013.01); *G06N 5/04* (2013.01); *G06N 5/043* (2013.01); *G06N 20/00* (2019.01); *G06Q 10/0631* (2013.01); *G06Q 50/205* (2013.01); *H04L 67/01* (2022.05); *H04L 67/10* (2013.01)

(58) Field of Classification Search
CPC ............ G06N 5/04; G06N 5/043; G06N 5/02; G06N 20/00; G06N 3/006; G06F 16/24553; G06F 16/2465; G06F 40/30; H04L 67/01; H04L 67/10; G06Q 10/0631; G06Q 50/205

See application file for complete search history.

(56) References Cited

U.S. PATENT DOCUMENTS 9,600,244 B1    3/2017  Hwang et al.
10,802,889 B1 * 10/2020  Ganesan ............... G06F 9/5005
(Continued)

FOREIGN PATENT DOCUMENTS

WO    2016028933 A1    2/2016

OTHER PUBLICATIONS

Salvucci, Dario D., Integration and Reuse in Cognitive Skill Acquisition; Department of Computer Science, Drexel University; Received Jun. 30, 2011; received in revised form Aug. 2012; accepted Aug. 7, 2012; ISSN: 0364-0213; pp. 829-860.

*Primary Examiner* — Etienne P Leroux
(74) *Attorney, Agent, or Firm* — Terrile, Cannatti & Chambers; Stephen A. Terrile

(57) ABSTRACT

A system, method, and computer-readable medium are disclosed for cognitive information processing. The cognitive information processing includes processing data from a plurality of data sources to provide cognitively processed insights via a augmented intelligence platform, the augmented intelligence platform comprising a cognitive process foundation platform, the cognitive process foundation platform comprising a cognitive composition platform, the cognitive composition platform being implemented to create custom extensions to the augmented intelligence platform.

20 Claims, 17 Drawing Sheets

(51) Int. Cl.
  G06F 16/2455 (2019.01)
  G06N 5/043 (2023.01)
  G06F 40/30 (2020.01)
  G06N 3/006 (2023.01)
  G06N 5/04 (2023.01)
  G06N 5/02 (2023.01)
  G06Q 10/0631 (2023.01)
  G06Q 50/20 (2012.01)
  H04L 67/10 (2022.01)
  H04L 67/01 (2022.01)

(56) References Cited

U.S. PATENT DOCUMENTS

| | | | |
|---|---|---|---|
| 11,032,022 B1* | 6/2021 | Sen | ........................ G06N 5/027 |
| 2007/0016464 A1 | 1/2007 | Yen et al. | |
| 2015/0294216 A1 | 10/2015 | Baughman et al. | |
| 2015/0356407 A1 | 12/2015 | Faith et al. | |
| 2015/0356433 A1 | 12/2015 | Sanchez et al. | |
| 2016/0048648 A1* | 2/2016 | Sanchez | ................. G16H 50/20 |
| | | | 706/12 |
| 2016/0048761 A1 | 2/2016 | Sanchez et al. | |
| 2017/0091663 A1 | 3/2017 | Sanchez et al. | |
| 2017/0185915 A1 | 6/2017 | Chawla et al. | |
| 2017/0293850 A1 | 10/2017 | Chawla et al. | |
| 2018/0165586 A1 | 6/2018 | Saxena et al. | |
| 2018/0165598 A1 | 6/2018 | Saxena et al. | |
| 2018/0218238 A1 | 8/2018 | Viirre et al. | |
| 2019/0095842 A1 | 3/2019 | Brousseau | |
| 2019/0102676 A1 | 4/2019 | Nazari et al. | |
| 2019/0158671 A1 | 5/2019 | Feast | |
| 2019/0171438 A1 | 6/2019 | Franchitti | |
| 2019/0205726 A1 | 7/2019 | Khabiri et al. | |
| 2019/0391956 A1 | 12/2019 | Kozhaya et al. | |
| 2020/0233485 A1 | 7/2020 | Chan et al. | |

* cited by examiner

Add Skill 1204

- Learning Algorithm >
- Cognitive Function >
- Machine Learning Style >
- Industry >
- Deployment >
- Service Providers >

~1202

COGNITIVESCALE
Product Classifier
The product classifier will classify different products into one or more identified categories. This processor will read, interpret, and evaluate product descriptions to determine the appropriate categorization. It ...

COGNITIVESCALE
Topic Detector
The Topic Detection processor will read and interpret unstructured content and summarize the unstructured text into a number of topics

COGNITIVESCALE
Trader Profile Builder
Builds a profile of a trader by combining existing structured information with behavioral profiling based on trader history

COGNITIVESCALE
Equity Trade Recommender
Recommends equity trading insights that are ranked, optimized, and reinforced with evidence to allow the trader to understand why they are seeing a specific insight

COGNITIVE SKILLS 1206

Cancel | Add Skill

*Figure 12*

COGNITIVE PROCESS COMPOSITION

BACKGROUND OF THE INVENTION

Field of the Invention

The present invention relates in general to the field of computers and similar technologies, and in particular to software utilized in this field. Still more particularly, it relates to a method, system and computer-usable medium for performing cognitive inference and learning operations.

Description of the Related Art

In general, "big data" refers to a collection of datasets so large and complex that they become difficult to process using typical database management tools and traditional data processing approaches. These datasets can originate from a wide variety of sources, including computer systems, mobile devices, credit card transactions, television broadcasts, and medical equipment, as well as infrastructures associated with cities, sensor-equipped buildings and factories, and transportation systems. Challenges commonly associated with big data, which may be a combination of structured, unstructured, and semi-structured data, include its capture, curation, storage, search, sharing, analysis and visualization. In combination, these challenges make it difficult to efficiently process large quantities of data within tolerable time intervals.

Nonetheless, big data analytics hold the promise of extracting insights by uncovering difficult-to-discover patterns and connections, as well as providing assistance in making complex decisions by analyzing different and potentially conflicting options. As such, individuals and organizations alike can be provided new opportunities to innovate, compete, and capture value.

One aspect of big data is "dark data," which generally refers to data that is either not collected, neglected, or underutilized. Examples of data that is not currently being collected includes location data prior to the emergence of companies such as Foursquare or social data prior to the advent of companies such as Facebook. An example of data that is being collected, but may be difficult to access at the right time and place, includes the side effects of certain spider bites while an affected individual is on a camping trip. As another example, data that is collected and available, but has not yet been productized or fully utilized, may include disease insights from population-wide healthcare records and social media feeds. As a result, a case can be made that dark data may in fact be of higher value than big data in general, especially as it can likely provide actionable insights when it is combined with readily-available data.

SUMMARY OF THE INVENTION

A method, system and computer-usable medium are disclosed for cognitive inference and learning operations.

In one embodiment the invention relates to a computer-implementable method for cognitive information processing, comprising: receiving data from a plurality of data sources; processing the data from the plurality of data sources to provide cognitively processed insights via a augmented intelligence platform, the augmented intelligence platform executing on a hardware processor of an information processing system, the augmented intelligence platform and the information processing system providing a cognitive computing function, the augmented intelligence platform comprising a cognitive process foundation platform, the cognitive process foundation platform comprising a cognitive composition platform, the cognitive composition platform being implemented to create custom extensions to the augmented intelligence platform; performing a learning operation to iteratively improve the cognitively processed insights over time; and, providing the cognitively processed insights to a destination, the destination comprising a cognitive application, the cognitive application enabling a user to interact with the cognitive insights.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: receiving data from a plurality of data sources; processing the data from the plurality of data sources to provide cognitively processed insights via a augmented intelligence platform, the augmented intelligence platform executing on a hardware processor of an information processing system, the augmented intelligence platform and the information processing system providing a cognitive computing function, the augmented intelligence platform comprising a cognitive process foundation platform, the cognitive process foundation platform comprising a cognitive composition platform, the cognitive composition platform being implemented to create custom extensions to the augmented intelligence platform; performing a learning operation to iteratively improve the cognitively processed insights over time; and, providing the cognitively processed insights to a destination, the destination comprising a cognitive application, the cognitive application enabling a user to interact with the cognitive insights.

In another embodiment the invention relates to a non-transitory, computer-readable storage medium embodying computer program code, the computer program code comprising computer executable instructions configured for: receiving data from a plurality of data sources; processing the data from the plurality of data sources to provide cognitively processed insights via a augmented intelligence platform, the augmented intelligence platform executing on a hardware processor of an information processing system, the augmented intelligence platform and the information processing system providing a cognitive computing function, the augmented intelligence platform comprising a cognitive process foundation platform, the cognitive process foundation platform comprising a cognitive composition platform, the cognitive composition platform being implemented to create custom extensions to the augmented intelligence platform; performing a learning operation to iteratively improve the cognitively processed insights over time; and, providing the cognitively processed insights to a destination, the destination comprising a cognitive application, the cognitive application enabling a user to interact with the cognitive insights.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 12 depicts a screen presentation of a cognitive skill composition platform user interface (UI);

DETAILED DESCRIPTION

Figure 1:
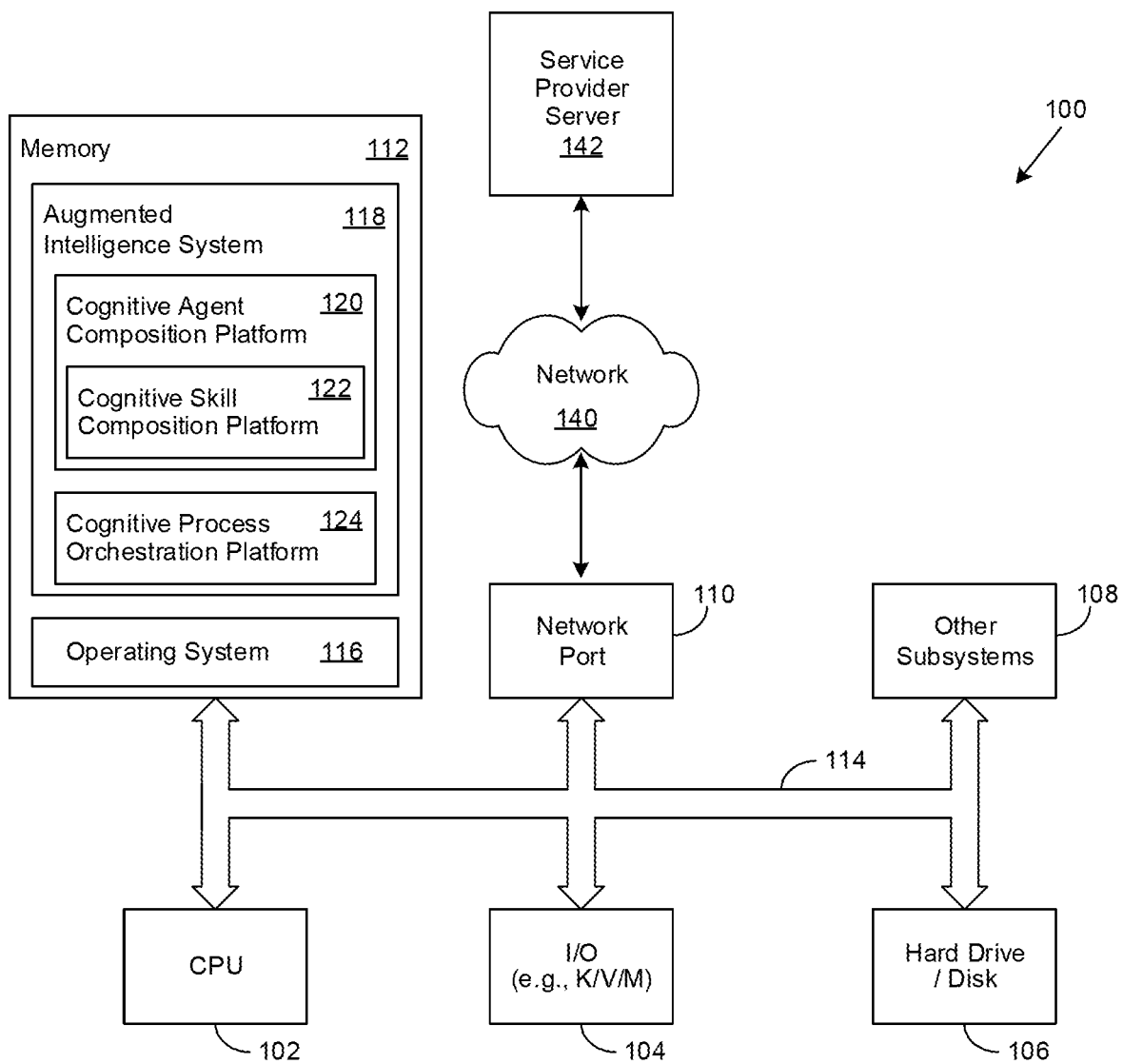
FIG. 1 depicts an exemplary client computer in which the present invention may be implemented.

A method, system and computer-usable medium are disclosed for augmented intelligence operations. Certain aspects of the invention reflect an appreciation that augmented intelligence is not technically different from what is generally regarded as general artificial intelligence (AI). However, certain aspects of the invention likewise reflect an appreciation that typical implementations of augmented intelligence are more oriented towards complementing, or reinforcing, the role human intelligence plays when discovering relationships and solving problems. Likewise, various aspects of the invention reflect an appreciation that certain advances in general AI approaches may provide different perspectives on how computers and software can participate in tasks that have previously been thought of being exclusive to humans.

Certain aspects of the invention reflect an appreciation that processes and applications employing AI models have become common in recent years. However, certain aspects of the invention likewise reflect an appreciation that known approaches to building, deploying, and maintaining such processes, applications and models at significant scale can be challenging. More particularly, various technical hurdles can prevent operational success in AI application development and deployment. As an example, empowering development teams to more easily develop AI systems and manage their end-to-end lifecycle can prove challenging.

Accordingly, certain aspects of the invention may reflect an appreciation that the ability to orchestrate a pipeline of AI components not only facilitates chained deployment of an AI system, but will likely reduce implementation intervals while simultaneously optimizing the use of human and computing resources. Likewise, certain aspects of the invention reflect an appreciation that achieving consistency across AI implementations may be facilitated by easily sharing machine learning (ML) models within the context of a standardized application modeling and execution language. In particular, such an approach may be advantageous when it is agnostic to common application development platforms and database conventions.

Certain aspects of the invention likewise reflect an appreciation that the development of ML models is often a small, but important part of the AI development process. However, getting ML models developed by data scientists and then putting them into production requires time and resources, both of which may be limited. Likewise, certain aspects of the invention reflect that AI systems are generally complex. Accordingly, a repeatable approach that reduces the skill required to develop and deploy AI systems can assist in achieving scalability of AI initiatives.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is a generalized illustration of an information processing system 100 that can be used to implement the system and method of the present invention. The information processing system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In certain embodiments, the information processing system 100 may also include a network port 110 operable to connect to a network 140, which is likewise accessible by a service provider server 142. The information processing system 100 likewise includes system memory 112, which is interconnected to the foregoing via one or more buses 114. System memory 112 further comprises operating system (OS) 116 and in certain embodiments may also comprise an augmented intelligence system (AIS) 118. In these and other embodiments, the AIS 118 may likewise comprise a cognitive agent composition platform 120 and a cognitive process orchestration platform 122. In certain embodiments, the cognitive agent composition platform 120 may include a cognitive skill composition platform 124. In certain embodiments, the information processing system 100 may be implemented to download the AIS 118 from the service provider server 142. In another embodiment, the functionality of the AIS 118 may be provided as a service from the service provider server 142.

In certain embodiments, the AIS 118 may be implemented to perform various cognitive computing operations. As used herein, cognitive computing broadly refers to a class of computing involving self-learning systems that use techniques such as spatial navigation, machine vision, and pattern recognition to increasingly mimic the way the human brain works. To be more specific, earlier approaches to computing typically solved problems by executing a set of instructions codified within software. In contrast, cognitive computing approaches are data-driven, sense-interpretation, insight-extracting, problem-solving, recommendation-making systems that have more in common with the structure of the human brain than with the architecture of contemporary, instruction-driven computers.

To further differentiate these distinctions, traditional computers must first be programmed by humans to perform specific tasks, while cognitive computing systems learn from their interactions with data and humans alike, and in a sense, program themselves to perform new tasks. To summarize the difference between the two, traditional computers are designed to calculate rapidly. In contrast, cognitive computing systems are designed to quickly draw inferences from data and gain new knowledge.

Cognitive computing systems achieve these abilities by combining various aspects of artificial intelligence, natural language processing, dynamic learning, and hypothesis generation to render vast quantities of intelligible data to assist humans in making better decisions. As such, cognitive computing systems can be characterized as having the ability to interact naturally with people to extend what either humans, or machines, could do on their own. Furthermore, they are typically able to process natural language, multi-structured data, and experience much in the same way as humans. Moreover, they are also typically able to learn a knowledge domain based upon the best available data and get better, and more immersive, over time.

It will be appreciated that more data is currently being produced every day than was recently produced by human beings from the beginning of recorded time. Deep within this ever-growing mass of data is a class of data known as "dark data," which includes neglected information, ambient signals, and insights that can assist organizations and individuals in augmenting their intelligence and deliver actionable insights through the implementation of cognitive processes.

As used herein, a cognitive process broadly refers to an instantiation of one or more associated cognitive computing operations, described in greater detail herein. In certain embodiments, a cognitive process may be implemented as a cloud-based, big data interpretive process that learns from user engagement and data interactions. In certain embodiments, such cognitive processes may be implemented to extract patterns and insights from dark data sources that are currently almost completely opaque. Examples of dark data include disease insights from population-wide healthcare records and social media feeds, or from new sources of information, such as sensors monitoring pollution in delicate marine environments.

In certain embodiments, a cognitive process may be implemented to include a cognitive application. As used herein, a cognitive application broadly refers to a software application that incorporates one or more cognitive processes. In certain embodiments, a cognitive application may be implemented to incorporate one or more cognitive processes with other functionalities, as described in greater detail herein.

Over time, it is anticipated that cognitive processes and applications will fundamentally change the ways in which many organizations operate as they invert current issues associated with data volume and variety to enable a smart, interactive data supply chain. Ultimately, cognitive processes and applications hold the promise of receiving a user query and immediately providing a data-driven answer from a masked data supply chain in response. As they evolve, it is likewise anticipated that cognitive processes and applications may enable a new class of "sixth sense" processes and applications that intelligently detect and learn from relevant data and events to offer insights, predictions and advice rather than wait for commands. Just as web and mobile applications have changed the way people access data, cognitive processes and applications may change the way people consume, and become empowered by, multi-structured data such as emails, social media feeds, doctors notes, transaction records, and call logs.

However, the evolution of such cognitive processes and applications has associated challenges, such as how to detect events, ideas, images, and other content that may be of interest. For example, assuming that the role and preferences of a given user are known, how is the most relevant information discovered, prioritized, and summarized from large streams of multi-structured data such as news feeds, blogs, social media, structured data, and various knowledge bases? To further the example, what can a healthcare executive be told about their competitor's market share? Other challenges include the creation of a contextually-appropriate visual summary of responses to questions or queries.

Figure 2:
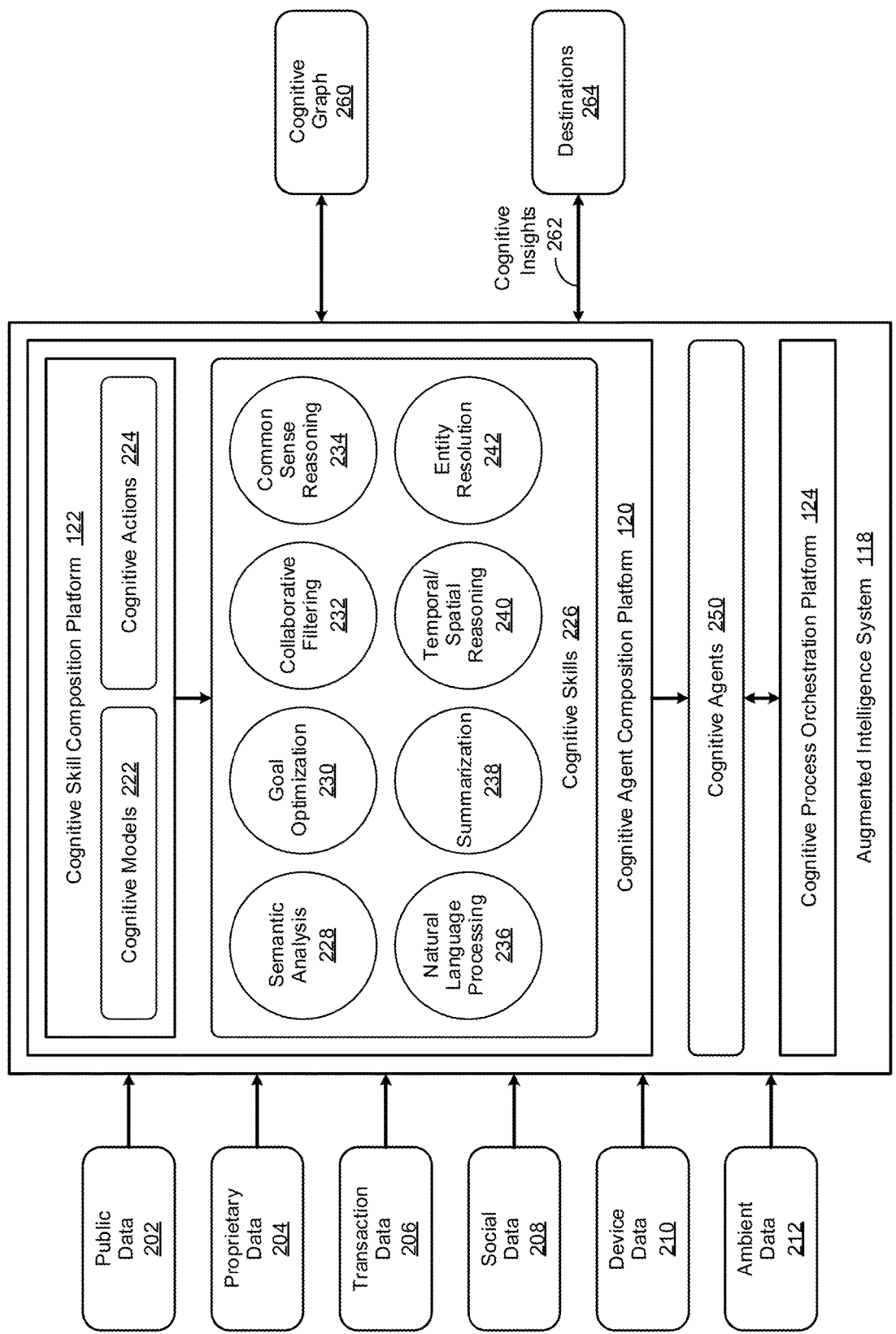
FIG. 2 is a simplified block diagram of an augmented intelligence system (AIS)

FIG. 2 is a simplified block diagram of an augmented intelligence system (AIS) implemented in accordance with an embodiment of the invention. As used herein, augmented intelligence broadly refers to an alternative conceptualization of general artificial intelligence (AI) oriented to the use of AI in an assistive role, with an emphasis on the implementation of cognitive computing, described in greater detail herein, to enhance human intelligence rather than replace it. In certain embodiments, an AIS 118 may be implemented to include a cognitive agent composition platform 120 and a cognitive process orchestration platform 124.

In certain embodiments, the cognitive agent composition platform 120 may be implemented to compose cognitive agents 250, which are in turn orchestrated by the cognitive process orchestration platform 124 to generate one or more cognitive insights 262, likewise described in greater detail herein. As used herein, a cognitive agent 250 broadly refers to a computer program that performs a task with minimum specific directions from users and learns from each interaction with data and human users. In certain embodiments, one or more cognitive agents 250 may be implemented as deployable modules that aggregate the logic, data and models required to implement an augmented intelligence operation.

In certain embodiments, a particular cognitive agent 250 may be implemented to be triggered by other cognitive agents 250, timers, or by external requests. In certain embodiments, a cognitive agent 250 may be composed from other cognitive agents 250 to create new functionalities. In certain embodiments, a cognitive agent 250 may be implemented to expose its functionality through a web service, which can be used to integrate it into a cognitive process or application, described in greater detail herein. In certain embodiments, cognitive agents 250 may be implemented to ingest various data, such as public 202, proprietary 204, transaction, social 208, device 210, and ambient 212 data, to provide a cognitive insight 262 or make a recommendation.

In certain embodiments, the cognitive agent composition platform 120 may be implemented to use cognitive skills 226, input/output services, datasets, and data flows, or a combination thereof, to compose a cognitive agent 250. In certain embodiments, a cognitive agent 250 may be implemented with an integration layer. In certain embodiments, the integration layer may be implemented to provide data to a particular cognitive agent 250 from a various data sources, services, such as a web service, other cognitive agents 250, or a combination thereof. In certain embodiments, the integration layer may be implemented to provide a user interface (UI) to a cognitive agent 250. In certain embodiments, the UI may include a web interface, a mobile device interface, or stationary device interface.

In certain embodiments, the cognitive agent composition platform 120 may be implemented to include a cognitive skill composition platform 122. In certain embodiments, the cognitive skill composition platform 122 may be implemented to compose a cognitive skill 226. As used herein, a cognitive skill 226 broadly refers to the smallest distinct unit of functionality in a cognitive agent 250 that can be invoked by one or more inputs to produce one or more outputs.

In certain embodiments, a cognitive skill 226 may be implemented to execute an atomic unit of work, which can be triggered by one or more inputs to produce one or more outputs. In certain embodiments, the inputs and outputs may include services, managed content, database connections, and so forth. In certain embodiments, cognitive skills 226 may be implemented to be connected via input/output units, or synapses, which control the flow of data through an associated cognitive agent 250.

In certain embodiments, one or more cognitive skills 226 may be implemented to provide various disjointed functionalities in a cognitive agent 250. In certain embodiments, such functionalities may include ingesting, enriching, and storing data from a data stream, training and testing a machine learning (ML) algorithm to generate an ML model, and loading data from an external source, such as a file. In certain embodiments, such functionalities may likewise include transforming the raw data into a dataset for further processing, extracting features from a dataset, or invoking various services, such as web services familiar to those of skill in the art.

As used herein, a cognitive model 222 broadly refers to a machine learning model that serves as a mathematical representation of a real-world process that can be facilitated by a cognitive computing operation. In certain embodiments, the cognitive skill composition platform 122 may be implemented to compose a cognitive skill 226 from one or more cognitive models 222. In certain embodiments, the implementation of a cognitive model 222 may involve the implementation of two cognitive actions 224. In certain embodiments, the first cognitive action 224 may be implemented to train the cognitive model 222 and the second cognitive action 224 may be implemented to make predictions based upon a set of unlabeled data to provide a cognitive insight 262.

In certain embodiments, a cognitive action 224 may be implemented as a function, a batch job, or a daemon, all of which will be familiar to skilled practitioners of the art. In certain embodiments, cognitive actions 224 may be implemented to be decoupled from a particular cognitive skill 226 such that they may be reused by other cognitive skills 226. In various embodiments, a cognitive action 224 implemented as a batch job may be configured to run at certain intervals or be triggered to run when a certain event takes place.

In certain embodiments, a cognitive skill 226 may be implemented to include a definition identifying various dataset input requirements, cognitive insight 262 outputs, and datasets needed to complete the cognitive skill's 226 associated cognitive actions 224. In certain embodiments, an output of one cognitive skill 226 may be used as the input to another cognitive skill 226 to build complex cognitive agents 250. In various embodiments, certain cognitive skills 226 may be implemented to control the flow of data through an associated cognitive agent 250. In various embodiments, a cognitive skill 226 may be implemented as a modular entity to interface a particular cognitive agent 250 to certain external applications and Application Program Interfaces (APIs). In certain embodiments, a cognitive skill 226 may be implemented to perform extract, transform, load (ETL) operations upon the output of another cognitive skill 226, thereby serving as a wrapper for an ML classifier or regressor.

As used herein, an input/output service broadly refers to a live link that is implemented to send and receive data. In certain embodiments, input/output services may be defined in input/output pairs that require and deliver a payload to and from a cognitive agent 250. In certain embodiments, public 202, proprietary 204, transaction, social 208, device 210, and ambient 212 data may be ingested and processed by the AIS 118 to generate one or more datasets. As used herein, a dataset broadly refers to a type of data input a cognitive agent 250 may be implemented to ingest. In certain embodiments, such a dataset may be implemented to include a definition that includes the source of the data and its corresponding schema.

Various embodiments of the invention reflect an appreciation that the implementation of cognitive skills 226 in certain embodiments may streamline, or otherwise facilitate, the construction of certain cognitive agents 250. In various embodiments, certain cognitive skills 226 may be implemented as micro services and published in a repository of AIS components, described in greater detail herein, as ready-to-use units, which can be mixed and matched between cognitive computing projects. Certain embodiments of the invention reflect an appreciation that the ability to adopt an assembly model that supports the mixing and matching of cognitive skills 226 between cognitive computing projects may minimize the effort required to rewrite code for new cognitive agents 250, and by extension, shorten development cycles.

As shown in FIG. 2, examples of cognitive skills 226 used by the cognitive agent composition platform 1202 to generate cognitive agents 250 include semantic analysis 228, goal optimization 230, collaborative filtering 232, and common sense reasoning 234. Other examples of such cognitive skills 226 include natural language processing 236, summarization 238, temporal/spatial reasoning 240, and entity resolution 242. As used herein, semantic analysis broadly refers to performing various analysis operations to achieve a semantic level of understanding about language by relating syntactic structures.

In certain embodiments, various syntactic structures may be related from the levels of phrases, clauses, sentences, and paragraphs to the level of the body of content as a whole, and to its language-independent meaning. In certain embodiments, the semantic analysis 228 cognitive skill may include processing a target sentence to parse it into its individual parts of speech, tag sentence elements that are related to certain items of interest, identify dependencies between individual words, and perform co-reference resolution. For example, if a sentence states that the author really enjoys the hamburgers served by a particular restaurant, then the name of the "particular restaurant" is co-referenced to "hamburgers."

As likewise used herein, goal optimization broadly refers to performing multi-criteria decision making operations to achieve a given goal or target objective. In certain embodiments, one or more goal optimization 230 cognitive skills may be orchestrated by the cognitive composition platform 122 to generate a cognitive agent 250 for defining predetermined goals, which in turn contribute to the generation of an associated cognitive insight 262. For example, goals for planning a vacation trip may include low cost (e.g., transportation and accommodations), location (e.g., by the beach), and speed (e.g., short travel time). In this example, it will be appreciated that certain goals may be in conflict with another. As a result, a cognitive insight 262 provided by the AIS 118 to a traveler may indicate that hotel accommodations by a beach may cost more than they care to spend.

Collaborative filtering, as used herein, broadly refers to the process of filtering for information or patterns through the collaborative involvement of multiple cognitive agents, viewpoints, data sources, and so forth. In certain embodiments, the application of such collaborative filtering 232 cognitive skills may involve very large and different kinds of data sets, including sensing and monitoring data, financial data, and user data of various kinds. In certain embodiments, collaborative filtering may also refer to the process of making automatic predictions associated with predetermined interests of a user by collecting preferences or other information from many users. For example, if person 'A' has the same opinion as a person 'B' for a given issue 'x', then an assertion can be made that person 'A' is more likely to have the same opinion as person 'B' opinion on a different issue 'y' than to have the same opinion on issue 'y' as a randomly chosen person. In certain embodiments, the collaborative filtering 206 cognitive skill may be implemented with various recommendation engines familiar to those of skill in the art to make recommendations.

As used herein, common sense reasoning broadly refers to simulating the human ability to make deductions from common facts they inherently know. Such deductions may be made from inherent knowledge about the physical properties, purpose, intentions and possible behavior of ordinary things, such as people, animals, objects, devices, and so on. In various embodiments, certain common sense reasoning 234 cognitive skills may be composed by the cognitive agent composition platform 120 to generate a cognitive agent 250 that assists the AIS 118 in understanding and disambiguating words within a predetermined context. In certain embodiments, the common sense reasoning 234 cognitive skill may be used by the cognitive agent composition platform 120 to generate a cognitive agent 250 that allows the AIS 118 to generate text or phrases related to a target word or phrase to perform deeper searches for the same terms. It will be appreciated that if the context of a word is better understood, then a common sense understanding of the word can then be used to assist in finding better or more accurate information. In certain embodiments, the better or more accurate understanding of the context of a word, and its related information, allows the AILS 118 to make more accurate deductions, which are in turn used to generate cognitive insights 262.

As likewise used herein, natural language processing (NLP) broadly refers to interactions with a system, such as the AIS 118, through the use of human, or natural, languages. In certain embodiments, various NLP 210 cognitive skills may be implemented by the AIS 118 to achieve natural language understanding, which enables it to not only derive meaning from human or natural language input, but to also generate natural language output.

Summarization, as used herein, broadly refers to processing a set of information, organizing and ranking it, and then generating a corresponding summary. As an example, a news article may be processed to identify its primary topic and associated observations, which are then extracted, ranked, and presented to the user. As another example, page ranking operations may be performed on the same news article to identify individual sentences, rank them, order them, and determine which of the sentences are most impactful in describing the article and its content. As yet another example, a structured data record, such as a patient's electronic medical record (EMR), may be processed using certain summarization 238 cognitive skills to generate sentences and phrases that describes the content of the EMR. In certain embodiments, various summarization 238 cognitive skills may be used by the cognitive agent composition platform 120 to generate to generate a cognitive agent 250 that provides summarizations of content streams, which are in turn used by the AIS 118 to generate cognitive insights 262.

As used herein, temporal/spatial reasoning broadly refers to reasoning based upon qualitative abstractions of temporal and spatial aspects of common sense knowledge, described in greater detail herein. For example, it is not uncommon for a particular set of data to change over time. Likewise, other attributes, such as its associated metadata, may also change over time. As a result, these changes may affect the context of the data. To further the example, the context of asking someone what they believe they should be doing at 3:00 in the afternoon during the workday while they are at work may be quite different than asking the same user the same question at 3:00 on a Sunday afternoon when they are at home. In certain embodiments, various temporal/spatial reasoning 214 cognitive skills may be used by the cognitive agent composition platform 120 to generate a cognitive agent 250 for determining the context of queries, and associated data, which are in turn used by the AIS 118 to generate cognitive insights 262.

As likewise used herein, entity resolution broadly refers to the process of finding elements in a set of data that refer to the same entity across different data sources (e.g., structured, non-structured, streams, devices, etc.), where the target entity does not share a common identifier. In certain embodiments, various entity resolution 216 cognitive skills may be used by the cognitive agent composition platform 120 to generate a cognitive agent 250 that can be used to identify significant nouns, adjectives, phrases or sentence elements that represent various predetermined entities within one or more domains. From the foregoing, it will be appreciated that the generation of one or more of the semantic analysis 228, goal optimization 230, collaborative filtering 232, common sense reasoning 234, natural language processing 236, summarization 238, temporal/spatial reasoning 240, and entity resolution 240 cognitive skills by the cognitive process orchestration platform 124 can facilitate the generation of a semantic, cognitive model.

In certain embodiments, the AIS 118 may receive public 202, proprietary 204, transaction, social 208, device 210, and ambient 212 data, or a combination thereof, which is then processed by the AIS 118 to generate one or more cognitive graphs 230. As used herein, public 202 data broadly refers to any data that is generally available for consumption by an entity, whether provided for free or at a cost. As likewise used herein, proprietary 204 data broadly refers to data that is owned, controlled, or a combination thereof, by an individual user, group, or organization, which is deemed important enough that it gives competitive advantage to that individual or organization. In certain embodiments, the organization may be a governmental, non-profit, academic or social entity, a manufacturer, a wholesaler, a retailer, a service provider, an operator of an AIS 118, and others. In certain embodiments, the public data 202 and proprietary 204 data may include structured, semi-structured, or unstructured data.

As used herein, transaction 206 data broadly refers to data describing an event, and is usually described with verbs. In typical usage, transaction data includes a time dimension, a numerical value, and certain reference data, such as references to one or more objects. In certain embodiments, the transaction 206 data may include credit or debit card transaction data, financial services data of all kinds (e.g., mortgages, insurance policies, stock transfers, etc.), purchase order data, invoice data, shipping data, receipt data, or any combination thereof. In certain embodiments, the transaction data 206 may include blockchain-associated data, smart contract data, or any combination thereof. Skilled practitioners of the art will realize that many such examples of transaction 206 data are possible. Accordingly, the foregoing is not intended to limit the spirit, scope or intent of the invention.

As used herein, social 208 data broadly refers to information that social media users publicly share, which may include metadata such as the user's location, language spoken, biographical, demographic or socio-economic information, and shared links. As likewise used herein, device 210 data broadly refers to data associated with, or generated by, an apparatus. Examples of device 210 data include data associated with, or generated by, a vehicle, home appliance, security systems, and so forth, that contain electronics, software, sensors, actuators, and connectivity, or a combination thereof, that allow the collection, interaction and provision of associated data.

As used herein, ambient 212 data broadly refers to input signals, or other data streams, that may contain data providing additional insight or context to public 202, proprietary 204, transaction 206, social 208, and device 210 data received by the AIS 118. For example, ambient signals may allow the AIS 118 to understand that a user is currently using their mobile device, at location 'x', at time 'y', doing activity 'z'. To continue the example, there is a difference between the user using their mobile device while they are on an airplane versus using their mobile device after landing at an airport and walking between one terminal and another.

To extend the example, ambient 212 data may add additional context, such as the user is in the middle of a three leg trip and has two hours before their next flight. Further, they may be in terminal A1, but their next flight is out of C1, it is lunchtime, and they want to know the best place to eat. Given the available time the user has, their current location, restaurants that are proximate to their predicted route, and other factors such as food preferences, the AIS 118 can perform various cognitive operations and provide a cognitive insight 262 that includes a recommendation for where the user can eat.

To extend the example even further, the user may receive a notification while they are eating lunch at a recommended restaurant that their next flight has been canceled due to the previously-scheduled aircraft being grounded. As a result, the user may receive two cognitive insights 262 suggesting alternative flights on other carriers. The first cognitive insight 262 may be related to a flight that leaves within a half hour. The second cognitive insight 262 may be related to a second flight that leaves in an hour but requires immediate booking and payment of additional fees. Knowing that they would be unable to make the first flight in time, the user elects to use the second cognitive insight 262 to automatically book the flight and pay the additional fees through the use of a digital currency transaction.

In certain embodiments, the AIS 118 may be implemented to represent knowledge in the cognitive graph 260, such that the knowledge can be used to perform reasoning and inference operations. In certain embodiments, the resulting reasoning and inference operations may be implemented to provide self-assurance. Accordingly, such approaches may be implemented in certain embodiments as a cognitive inference and learning system (CILS). In certain embodiments, the self-assurance resulting from such reasoning and inference operations may be implemented to provide cognitive insights 262 with associated explainability. In these embodiments, such explainability may be implemented to provide a rationale for their associated cognitive insights 262.

As used herein, a cognitive graph 260 refers to a representation of expert knowledge, associated with individuals and groups over a period of time, to depict relationships between people, places, and things using words, ideas, audio and images. As such, it is a machine-readable formalism for knowledge representation that provides a common framework allowing data and knowledge to be shared and reused across user, application, organization, and community boundaries. In various embodiments, the information contained in, and referenced by, a cognitive graph 260 may be derived from many sources, such as public 202, proprietary 204, transaction, social 208, device 210, and ambient 212 data, or a combination thereof. In certain of these embodiments, the cognitive graph 260 may be implemented to assist in the identification and organization of information associated with how people, places and things are related to one other. In various embodiments, the cognitive graph 260 may be implemented to enable automated cognitive agents 250, described in greater detail herein, to access the Web more intelligently, enumerate inferences through utilization of various data sources, and provide answers to questions by serving as a computational knowledge engine.

In certain embodiments, the cognitive graph 260 may be implemented to not only elicit and map expert knowledge by deriving associations from data, but to also render higher level insights and accounts for knowledge creation through collaborative knowledge modeling. In certain embodiments, the cognitive graph 260 may be implements as a machine-readable, declarative memory system that stores and learns both episodic memory (e.g., specific personal experiences associated with an individual or entity), and semantic memory, which stores factual information (e.g., geo location of an airport or restaurant).

For example, the cognitive graph 260 may know that a given airport is a place, and that there is a list of related places such as hotels, restaurants and departure gates. Furthermore, the cognitive graph 260 may know that people such as business travelers, families and college students use the airport to board flights from various carriers, eat at various restaurants, or shop at certain retail stores. The cognitive graph 260 may also have knowledge about the key attributes from various retail rating sites that travelers have used to describe the food and their experience at various venues in the airport over the past six months.

In various embodiments, the cognitive process orchestration platform 124 may be implemented to orchestrate certain cognitive agents 250 to generate one or more cognitive insights 262. In certain embodiments, the resulting cognitive insights 262 may be delivered to one or more destinations 264, described in greater detail herein. As used herein, a cognitive insight 262 broadly refers to an actionable, real-time recommendation tailored to a particular user, as described in greater detail herein. Examples of such recommendations include getting an immunization, correcting a billing error, taking a bus to an appointment, considering the purchase of a particular item, selecting a recipe, eating a particular food item, and so forth.

In certain embodiments, cognitive insights 262 may be generated from various data sources, such as public 202, proprietary 204, transaction, social 208, device 210, and ambient 212 data, a cognitive graph 260, or a combination thereof. For example, if a certain percentage of the population in a user's community is suffering from the flu, then the user may receive a recommendation to get a flu shot. In this example, determining the afflicted percentage of the population, or determining how to define the community itself, may prove challenging. Accordingly, generating meaningful insights or recommendations may be difficult for an individual user, especially when related datasets are large.

In certain embodiments, a resulting cognitive insight 262 stream may be implemented to be bidirectional, supporting flows of information both too and from various destinations 264. In these embodiments, a first flow of cognitive insights 262 may be generated in response to receiving a query, and subsequently delivered to one or more destinations 264. Likewise, a second flow of cognitive insights 262 may be generated in response to detecting information about a user of one or more of the destinations 264.

Such use may result in the provision of information to the AIS 118. In response, the AIS 118 may process that information, in the context of what it knows about the user, and provide additional information to the user, such as a recommendation. In certain embodiments, a stream of cognitive insights 262 may be configured to be provided in a "push" stream configuration familiar to those of skill in the art. In certain embodiments, a stream of cognitive insights 262 may be implemented to use natural language approaches familiar to skilled practitioners of the art to support interactions with a user.

In certain embodiments, a stream of cognitive insights 262 may be implemented to include a stream of visualized insights. As used herein, visualized insights broadly refer to cognitive insights that are presented in a visual manner, such as a map, an infographic, images, and so forth. In certain embodiments, these visualized insights may include various cognitive insights, such as "What happened?", "What do I know about it?", "What is likely to happen next?", or "What should I do about it?" In these embodiments, the stream of cognitive insights 262 may be generated by various cognitive agents 250, which are applied to various sources, datasets, and cognitive graphs.

In certain embodiments, the AIS 118 may be implemented to deliver Cognition as a Service (CaaS). As such, it provides a cloud-based development and execution platform that allow various cognitive applications and services to function more intelligently and intuitively. In certain embodiments, cognitive applications powered by the AIS 118 are able to think and interact with users as intelligent virtual assistants. As a result, users are able to interact with such cognitive applications by asking them questions and giving them commands. In response, these cognitive applications will be able to assist the user in completing tasks and managing their work more efficiently.

In these and other embodiments, the AIS 118 may be implemented to operate as an analytics platform to process big data, and dark data as well, to provide data analytics through a public, private or hybrid cloud environment, described in greater detail herein. As used herein, cloud analytics broadly refers to a service model wherein data sources, data models, processing applications, computing power, analytic models, and sharing or storage of results are implemented within a cloud environment to perform one or more aspects of analytics.

In certain embodiments, users may submit queries and computation requests in a natural language format to the AIS 118. In response, they are provided with a ranked list of relevant answers and aggregated information with useful links and pertinent visualizations through a graphical representation. In these embodiments, the cognitive graph 230 may be implemented to generate semantic and temporal maps to reflect the organization of unstructured data and to facilitate meaningful learning from potentially millions of lines of text, much in the same way as arbitrary syllables strung together create meaning through the concept of language.

In certain embodiments, the AIS 118 may be implemented to represent knowledge in the cognitive graph 260, such that the knowledge can be used to perform reasoning and inference operations. In certain embodiments, the resulting reasoning and inference operations may be implemented to provide self-assurance. Accordingly, such approaches may be implemented in certain embodiments as a cognitive inference and learning system (CILS). In certain embodiments, the self-assurance resulting from such reasoning and inference operations may be implemented to provide cognitive insights with associated explainability. In these embodiments, such explainability may be implemented to provide a rationale for their associated cognitive insights.

Figure 3:
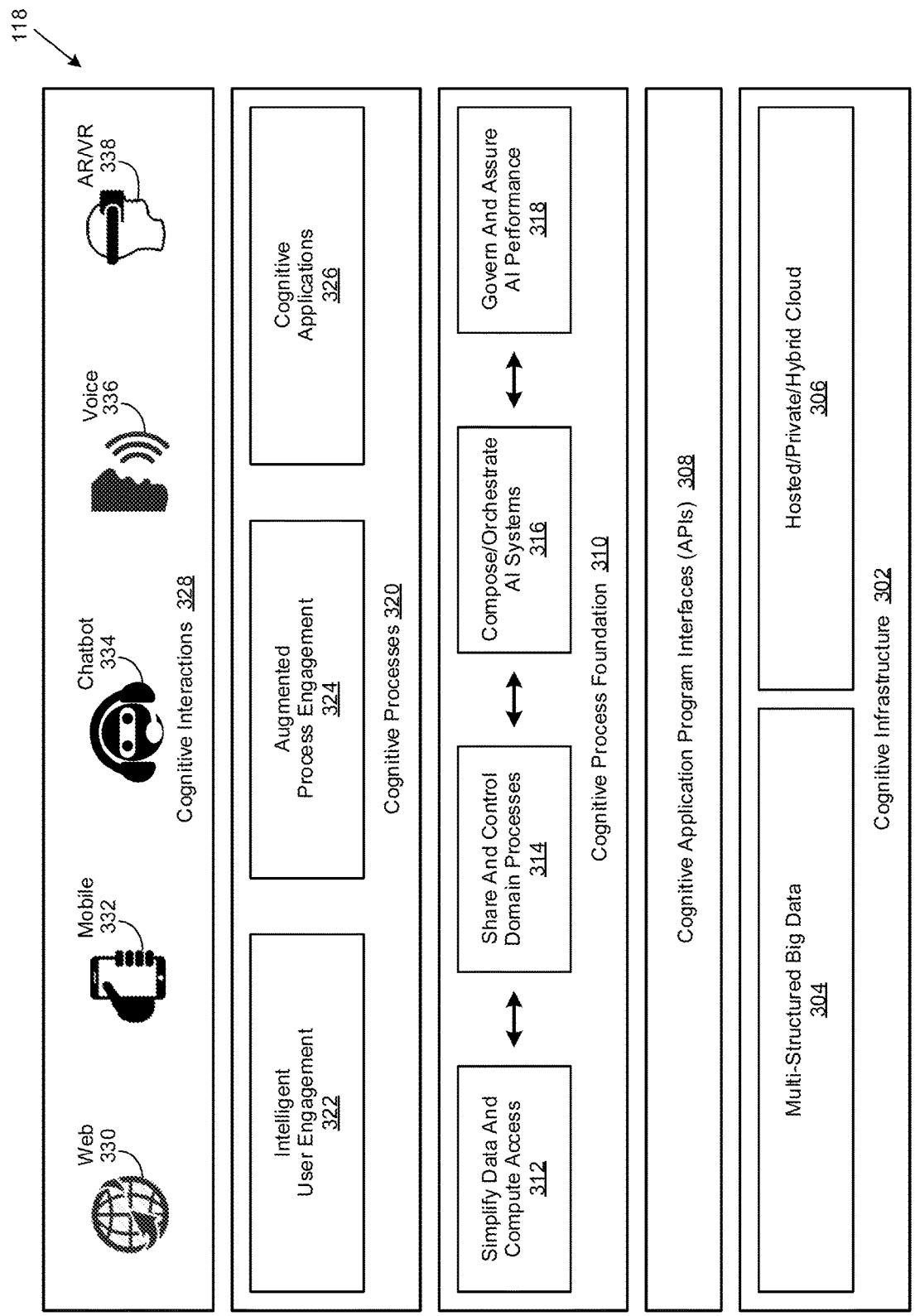
FIG. 3 is a simplified block diagram of an AIS reference model.

FIG. 3 is a simplified block diagram of an augmented intelligence system (AIS) reference model implemented in accordance with an embodiment of the invention. In various embodiments, the AIS 118 reference model shown in FIG. 3 may be implemented as a reference for certain components included in, and functionalities performed by, an AIS 118, described in greater detail herein. In certain embodiments, these components and functionalities may include a cognitive infrastructure 302, one or more cognitive Application Program Interfaces (APIs) 308, a cognitive process foundation 310, various cognitive processes 320, and various cognitive interactions 328. In certain embodiments, the cognitive infrastructure 302 may include various sources of multi-structured big data 304 and a hosted/private/hybrid cloud infrastructure, both of which are described in greater detail herein.

In certain embodiments, the cognitive process foundation 310, likewise described in greater detail herein, may be implemented to provide various cognitive computing functionalities. In certain embodiments, these cognitive computing functionalities may include the simplification of data and compute resource access 312. In certain embodiments, these cognitive computing functionalities may include various sharing and control 314 operations commonly associated with domain processes. In certain embodiments, these cognitive computing functionalities may include the composition and orchestration 316 of various artificial intelligence (AI) systems.

In certain embodiments, the composition and orchestration 316 of various artificial intelligence (AI) systems may include the composition of cognitive skills and cognitive agents, as described in greater detail herein. In certain embodiments, the composition and orchestration 316 may include the orchestration of various cognitive agents, and associated AIS components, to generate one or more cognitive processes, likewise described in greater detail herein. In certain embodiments, these cognitive computing functionalities may include governance and assurance 310 operations associated with ensuring AI performance in the context of various cognitive computing operations. In certain embodiments, these various cognitive computing functionalities may be implemented to work individually, or in concert with one another. In these embodiments, the method by which these various cognitive computing functionalities is a matter of design choice.

As used herein, a cognitive process broadly refers to an instantiation of a cognitive computing operation, described in greater detail herein. In certain embodiments, the cognitive process 320 may be implemented as an intelligent user engagement 322. As used herein, an intelligent user engagement 322 broadly refers to the application of certain cognitive operations to assist in more meaningful cognitive interactions 328 between a user and certain cognitive processes 320. In certain embodiments, the cognitive process 320 may be implemented as an augmented process engagement 324. As used herein, an augmented process engagement broadly refers to the application of cognitive operations to improve interaction between certain cognitive processes 320. In certain embodiments, the cognitive process 320 may be implemented as one or more cognitive applications 326, described in greater detail herein. In certain embodiments, cognitive interactions 328 may be implemented to support user interactions with an AIS 118 through web 330 applications, mobile 332 applications, chatbot 334 interactions, voice 336 interactions, augmented reality (AR) and virtual reality (VR) interactions 338, or a combination thereof.

Figure 4:
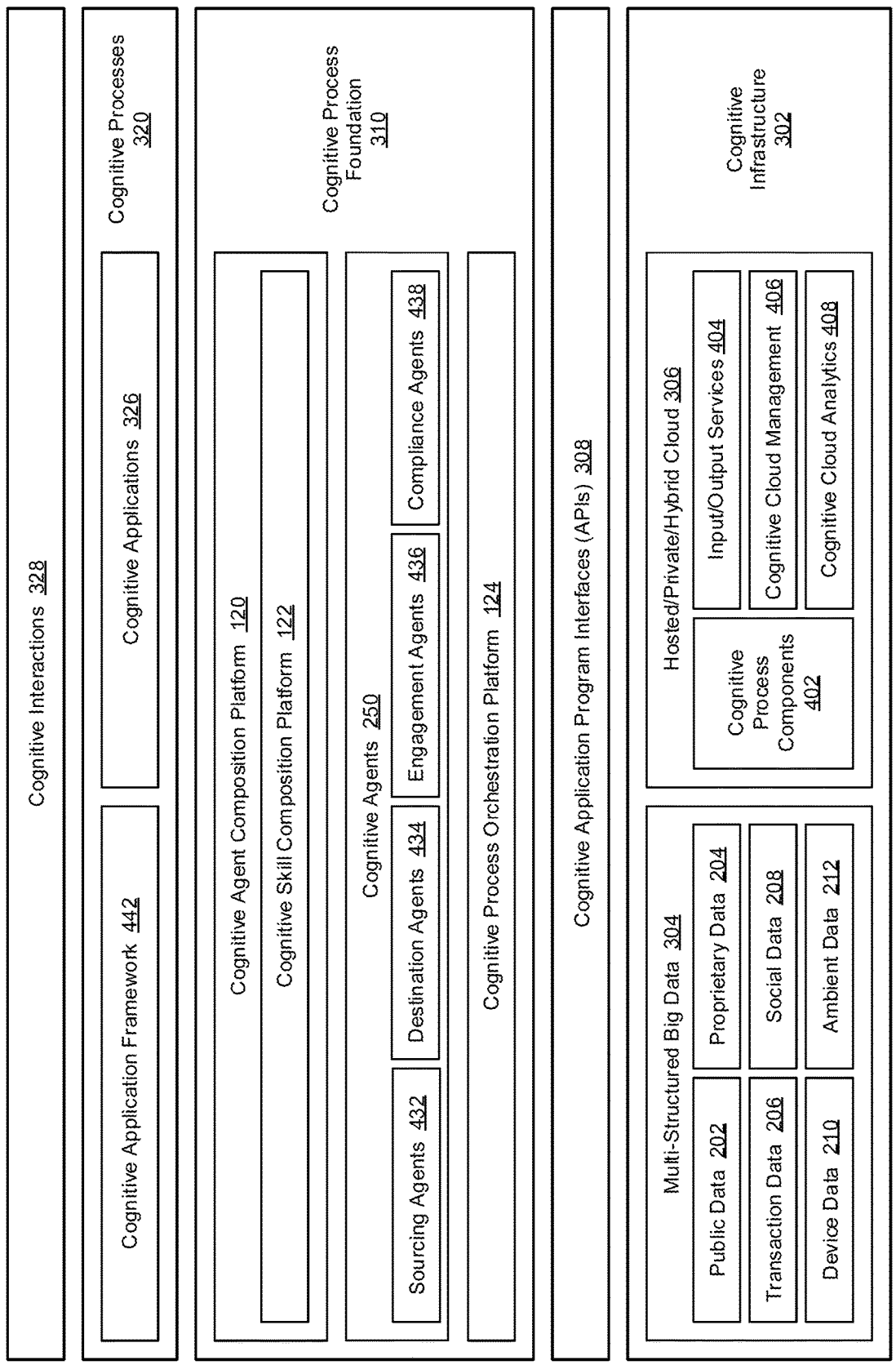
FIG. 4 is a simplified block diagram of an AIS platform.

FIG. 4 is a simplified block diagram of an augmented intelligence system (AIS) platform implemented in accordance with an embodiment of the invention. In certain embodiments, the AIS platform may be implemented to include various cognitive processes 320, a cognitive process foundation 310, various Cognitive Application Program Interfaces (APIs) 308, and an associated cognitive infrastructure 302. In certain embodiments, the cognitive processes 320 may be implemented to understand and adapt to the user, not the other way around, by natively accepting and understanding human forms of communication, such as natural language text, audio, images, video, and so forth.

In these and other embodiments, the cognitive processes 320 may be implemented to possess situational and temporal awareness based upon ambient signals from users and data, which facilitates understanding the user's intent, content, context and meaning to drive goal-driven dialogs and outcomes. Further, they may be designed to gain knowledge over time from a wide variety of structured, non-structured, transactional, and device data sources, continuously interpreting and autonomously reprogramming themselves to better understand a given domain. As such, they are well-suited to support human decision making, by proactively providing trusted advice, offers and recommendations while respecting user privacy and permissions.

In certain embodiments, the cognitive processes 320 may be implemented in concert with a cognitive application framework 442. In certain embodiments, the cognitive processes 320 and the cognitive application framework 442 may be implemented to support plug-ins and components that facilitate the creation of various cognitive applications 326, described in greater detail herein. In certain embodiments, the cognitive processes 320 may be implemented to include widgets, user interface (UI) components, reports, charts, and back-end integration components familiar to those of skill in the art.

As likewise shown in FIG. 4, the cognitive process foundation 310 may be implemented in certain embodiments to include a cognitive process orchestration platform 124, a cognitive process composition platform 122, and various cognitive agents 250, all of which are described in greater detail herein. In certain embodiments, the cognitive orchestration platform 124 may be implemented to orchestrate various cognitive agents 250 to enable one or more cognitive processes 320. In certain embodiments, the cognitive orchestration platform 124 may be implemented to manage accounts and projects, along with user-specific metadata that is used to drive processes and operations within the cognitive process foundation 310 for a particular project.

In certain embodiments, the cognitive agent composition platform 120 may be implemented to compose one or more cognitive agents 250. In certain embodiments, the cognitive agents 250 may include a sourcing agent 432, a destination agent 434, an engagement agent 436, a compliance agent 438, or a combination thereof. In certain embodiments, the sourcing agent 432 may be implemented to source a variety of multi-site, multi-structured source streams of data described in greater detail herein.

In various embodiments, the destination agent 436 may be implemented to publish cognitive insights to a consumer of cognitive insight data. Examples of such consumers of cognitive insight data include target databases, public or private blockchains, business intelligence applications, and mobile applications. It will be appreciated that many such examples of cognitive insight data consumers are possible.

In certain embodiments, the engagement agents 436 may be implemented to define various cognitive interactions 328 between a user and a particular cognitive process 320. In certain embodiments, the compliance agents 438 may be implemented to ensure compliance with certain business and technical guidelines, rules, regulations or other parameters associated with an organization.

In certain embodiments, the resulting cognitive agents 250 may be orchestrated by the cognitive process orchestration platform 124 to create cognitive insights, described in greater detail herein. In certain embodiments, the resulting cognitive agents 250 may be orchestrated by the cognitive process orchestration platform 124 to create custom extensions to the AIS 118 shown in FIG. 2. In certain embodiments, the cognitive process foundation 310 may be implemented for the development of a cognitive application 326, which may subsequently be deployed in a public, private or hybrid cloud 306 cloud environment.

In various embodiments, the APIs 308 may be implemented for use by the cognitive process orchestration platform 124 to orchestrate certain cognitive agents 250, described in greater detail herein, which are then executed by the AIS 118 to generate cognitive insights. In certain embodiments, the APIs 308 may be implemented to access various cognitive infrastructure 302 components. In certain embodiments, the infrastructure components may include repositories of multi-structured big data 304, a hosted/private/hybrid cloud 306 environment, or both. In certain embodiments, the repositories of multi-structured big data 304 may be accessed by the AIS platform to generate cognitive insights.

In certain embodiments, the repositories of multi-structured big data 304 may include individual repositories of public 202, proprietary 204, transaction 206, social 208, device 210, and ambient 212 data, or some combination thereof. In certain embodiments, the repositories of transaction data 206 may include blockchain data associated with one or more public blockchains, one or more private blockchains, or a combination thereof. In certain embodiments, the repositories of transaction data 206 may be used to generate a blockchain-associated cognitive insight.

In certain embodiments, as described in greater detail herein, the cognitive infrastructure 302 environment may include various input/output services 404, described in greater detail herein, a cognitive cloud management 406 platform, and various cognitive cloud analytics 408 components, or a combination thereof. In certain embodiments, hosted/private/hybrid cloud 306 may include a repository of cognitive process components 402. In certain embodiments, the repository of cognitive process components 402 may be implemented to store cognitive agents, cognitive skills, cognitive models, cognitive algorithms, and cognitive actions.

In various embodiments, the contents of the cognitive process components 402 may be used by the cognitive skill composition platform 122 to compose certain cognitive skills. In various embodiments, the contents of the cognitive process components 402 may be used by the cognitive agent composition platform 120 to compose certain cognitive agents. In various embodiments, the contents of the cognitive process components 402 may be used by the cognitive process orchestration platform 124 to orchestrate certain cognitive processes 320.

Figure 5:
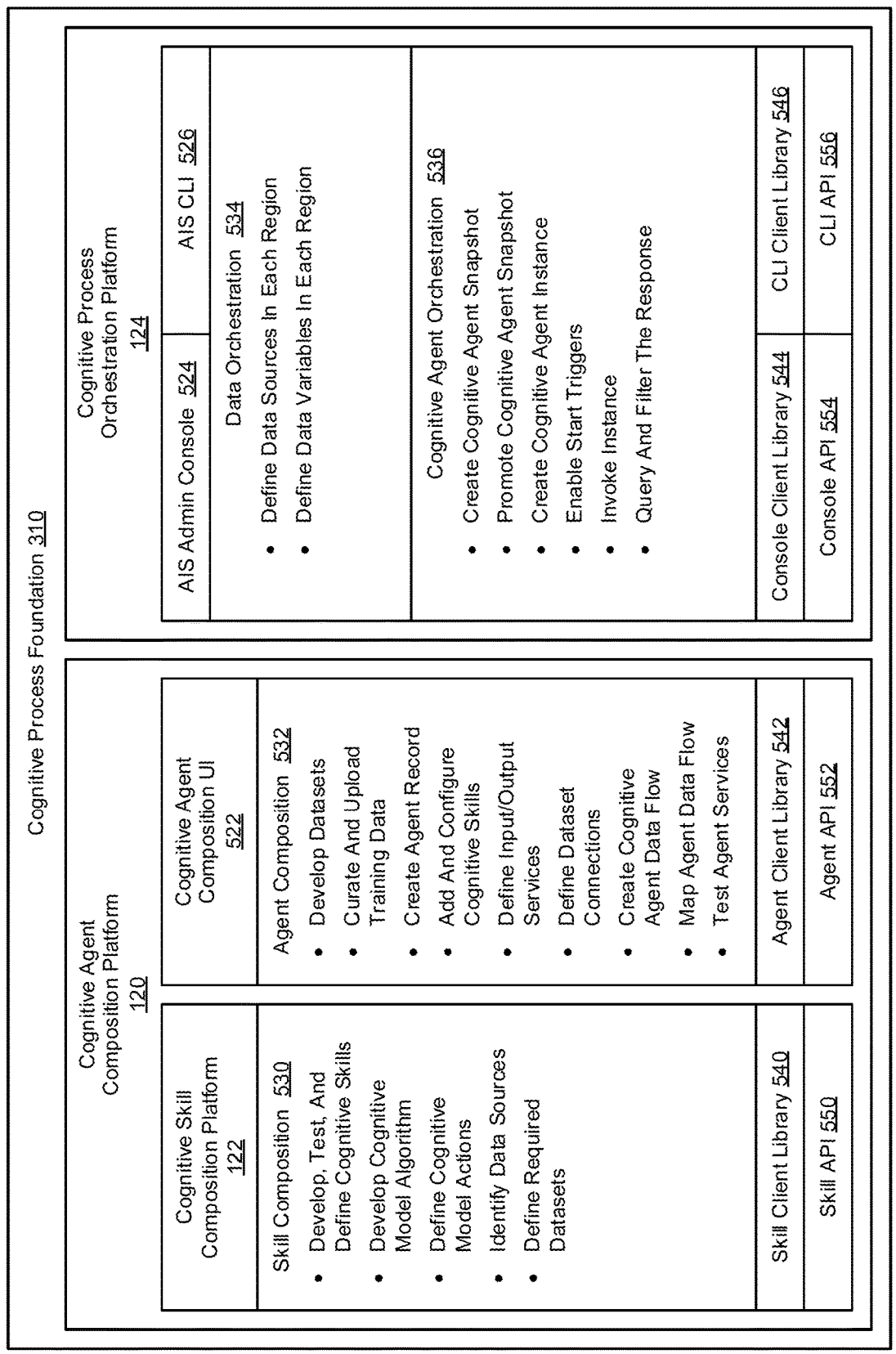
FIG. 5 shows a simplified block diagram of components associated with a cognitive process foundation.

FIG. 5 shows a simplified block diagram of components associated with a cognitive process foundation implemented in accordance with an embodiment of the invention. In certain embodiments, the cognitive process foundation 310 may be implemented to include a cognitive agent composition platform 120 and a cognitive process orchestration platform 124. In certain embodiments, the cognitive agent composition platform 120 may be implemented to include a cognitive skill composition platform 122, described in greater detail herein, and a cognitive agent composition User Interface (UI) 522, likewise described in greater detail herein.

In various embodiments, the cognitive skill composition platform 122 may be implemented to perform certain operations associated with the composition of a particular cognitive skill. In certain embodiments, the cognitive skill composition 530 operations may include the development, testing, and definition of a cognitive skill, as described in greater detail herein. In certain embodiments, the cognitive skill composition 530 operations may include the development of one or more cognitive algorithms, as likewise described in greater detail herein. In certain embodiments, the cognitive skill composition 530 operations may include the definition of various cognitive model actions. In certain embodiments, the cognitive skill composition 530 operations may include the identification of data sources, such as the public 202, proprietary 204, transaction, social 208, device 210, and ambient 212 data sources described in the descriptive text associated with FIG. 2. In certain embodiments, the cognitive skill composition 530 operations may include the definition of required datasets, described in greater detail herein.

In certain embodiments, the cognitive skill composition platform 122 may be implemented with an associated cognitive skill client library 540 and one or more cognitive skill Application Program Interfaces (APIs) 550. In certain embodiments, the cognitive skill client library 540, and one or more cognitive skill Application Program Interfaces (APIs) 550, may be implemented by the cognitive skill composition platform 122 to compose a particular cognitive skill.

In certain embodiments, the cognitive agent composition UI 520 may be implemented to provide a visual representation of the execution of individual operations associated with the composition of a particular cognitive agent. In certain embodiments, the cognitive agent composition operations 522 may include the development of various datasets used by a particular cognitive agent during its execution. In various embodiments, the cognitive agent composition operations 522 may include the curation and uploading of certain training data used by a cognitive model associated with a particular cognitive agent.

In certain embodiments, the cognitive agent composition operations 522 may include creation of a cognitive agent record. In certain embodiments, the cognitive agent record may be implemented by an augmented intelligence system (AIS) to track a particular cognitive agent. In certain embodiments, the cognitive agent record may be implemented by an AIS to locate and retrieve a particular cognitive agent stored in a repository of AIS components, described in greater detail herein. In certain embodiments, the cognitive agent composition operations 522 may include the addition, and configuration of, one or more cognitive skills associated with a particular cognitive agent.

In certain embodiments, the cognitive agent composition operations 522 may include the definition of various input/output services, described in greater detail herein, associated with a particular cognitive agent. In certain embodiments, the cognitive agent composition operations 522 may include the definition of various dataset connections associated with a particular cognitive agent. In certain embodiments, the cognitive agent composition operations 522 may include the creation of one or more data flows associated with a particular cognitive agent. In certain embodiments, the cognitive agent composition operations 522 may include the mapping of one or more data flows associated with a particular cognitive agent. In certain embodiments, the cognitive agent composition operations 522 may include the testing of various services associated with a particular cognitive agent.

In certain embodiments, the cognitive agent composition platform 120 may be implemented with an associated cognitive agent client library 542 and one or more cognitive agent APIs 552. In certain embodiments, the cognitive agent library 542, and one or more cognitive agent APIs 552, may be implemented by the cognitive agent composition platform 120 to compose a particular cognitive agent.

In certain embodiments, the cognitive process foundation 310 may be implemented to include a cognitive process orchestration platform 124. In certain embodiments, the cognitive process orchestration platform 124 may be implemented to include an AIS administration console 524, an AIS command line interface (CLI) 526, or both. In certain embodiments, the AIS administration console 524 may be implemented as a Graphical User Interface (GUI).

In certain embodiments, the AIS administration console 524 and the AIS CLI 526, individually or in combination, may be implemented to manage the building blocks of a particular cognitive process, described in greater detail herein. In certain embodiments, the building blocks of a particular cognitive process may include one or more cognitive agents, likewise described in greater detail herein. In certain embodiments, the AIS administration console 524 and the AIS CLI 526, individually or in combination, may be implemented to manage lifecycle of a cognitive agent, described in greater detail herein.

In certain embodiments, the AIS administration console 524 may be implemented to manage a cognitive process user account. In certain embodiments, the AIS administration console 524 may be implemented view various AIS logs and metrics. In certain embodiments, the AIS administration console 524 may be implemented as a web interface familiar to those of skill in the art.

In certain embodiments, the AIS CLI 526 may be implemented to generate and deploy cognitive skills, created and save dataset definitions, invoke cognitive agent services, and configure cognitive action batch jobs and connections, or a combination thereof. In certain embodiments, the AIS CLI 526 may be implemented to add cognitive agent building blocks to the cognitive agent composition platform 120. In certain embodiments, the AIS CLI 526 may be implemented to execute cognitive agent lifecycle commands.

In certain embodiments, the AIS administration console 524 and the AIS CLI 526, individually or in combination, may be implemented to perform various data orchestration 534 operations. In certain embodiments, the data orchestration 534 operations may include the definition of data sources associated with a particular AIS region, described in greater detail herein. In certain embodiments, the data orchestration 534 operations may include the definition of various data variables associated with a particular AIS region.

In certain embodiments, the AIS administration console 524 and the AIS CLI 526, individually or in combination, may be implemented to perform various cognitive agent orchestration 536 operations. In certain embodiments, the cognitive agent orchestration 536 operations may include the creation of a cognitive agent snapshot. As used herein, a cognitive agent snapshot broadly refers to a depiction of the operational state of a cognitive agent at a particular instance in time during the execution of a cognitive process.

In certain embodiments, the cognitive agent orchestration 536 operations may include the promotion of a cognitive agent snapshot. As likewise used herein, promotion broadly refers to the transition of a cognitive agent, or a cognitive process, from one operational environment to another. As an example, the cognitive process orchestration platform 124 may be implemented in a development environment to generate a cognitive process by orchestrating certain cognitive agents, as described in greater detail herein. Once development has been completed, the resulting cognitive process may be promoted to a test environment. Thereafter, once testing of the cognitive process has been completed, it may be promoted to a user acceptance environment, and once the user acceptance phase has been completed, it may be promoted to a production environment.

In certain embodiments, the cognitive agent orchestration 536 operations may include the creation of a cognitive agent instance. In certain embodiments, the cognitive agent orchestration 536 operations may include enablement of start triggers for a particular cognitive agent. In certain embodiments, the cognitive agent orchestration 536 operations may include the invocation of a particular instance of a cognitive agent. In certain embodiments, the cognitive agent orchestration 536 operations may include querying and filtering responses received from a particular cognitive agent. In certain embodiments, the cognitive process orchestration platform 124 may be implemented with an associated AIS console client library 544, one or more AIS console APIs 554, an AIS CLI client library 546, one or more AIS CLI APIs 556, or a combination thereof.

Figure 6:
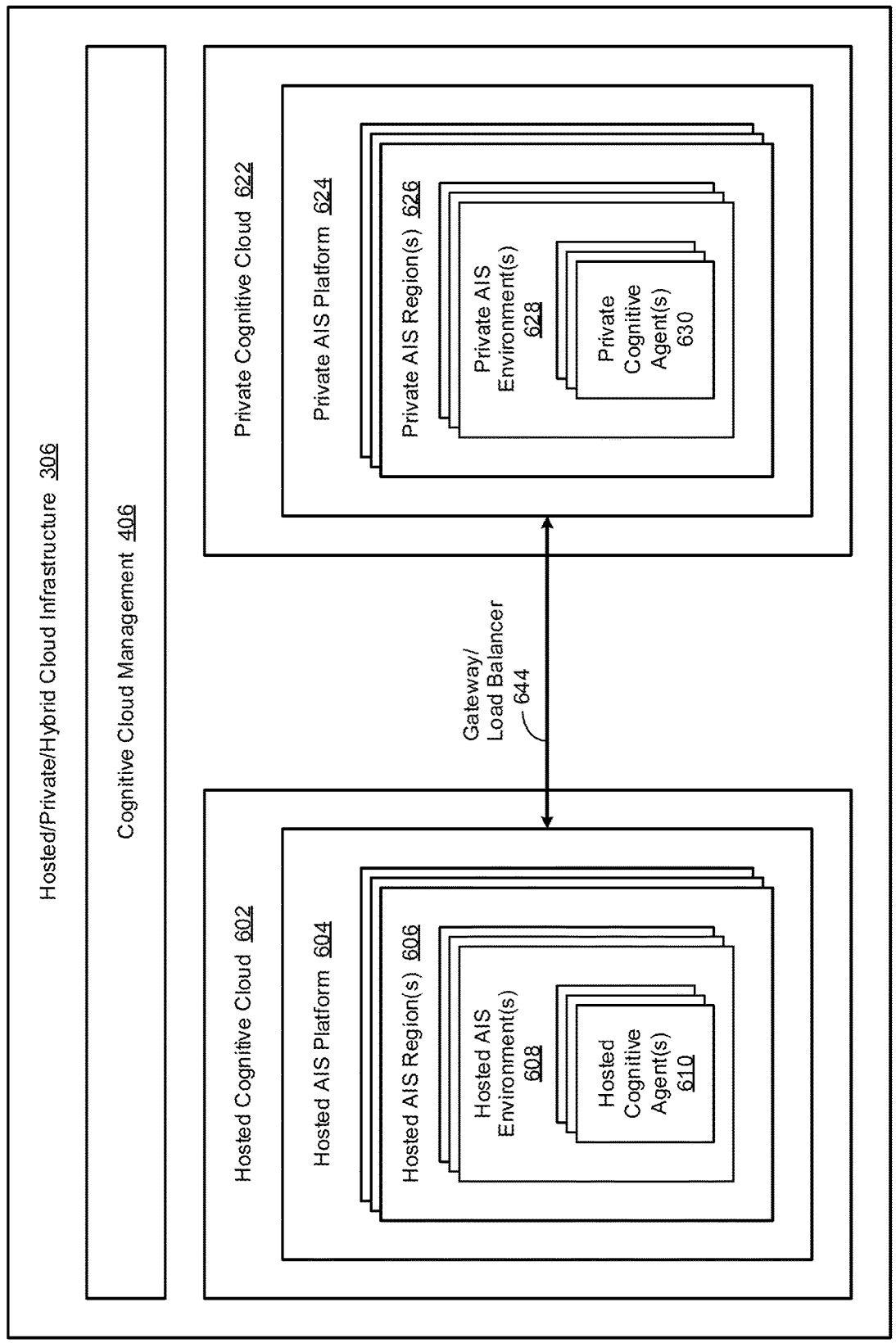
FIG. 6 is a simplified block diagram of a plurality of AIS platforms implemented within a hybrid cloud environment.

FIG. 6 is a simplified block diagram of a plurality of augmented intelligence system (AIS) platforms implemented in accordance with an embodiment of the invention within a hybrid cloud infrastructure. In certain embodiments, the hybrid cloud infrastructure 304 may be implemented to include a cognitive cloud management 402 platform, a hosted 602 cognitive cloud environment, and a private 622 cognitive cloud environment. In certain embodiments, the private 622 cognitive cloud environment may be implemented in a private network, such as commonly implemented by corporation or government organization.

In certain embodiments, the hosted 602 and private 622 cognitive cloud environment may respectively be implemented to include a hosted 604 and private 624 AIS platform. Likewise, in certain embodiments, the hosted 604 and private 624 AIS platforms may respectively be implemented to include one or more hosted 626 and private 626 AIS regions. As used herein, a hosted 606 AIS region broadly refers to a designated instantiation of an AIS implemented to execute on a corresponding hosted 604 platform. As likewise used herein, a private 626 AIS region broadly refers to a designated instantiation of an AIS implemented to execute on a corresponding private 624 platform. In certain embodiments, the designated instantiation of a hosted 606 or private 626 AIS region may be defined by a set of associated parameters.

As an example, the designation parameters associated with a hosted 606 or private 626 AIS region, individually or in combination, may to correspond to a defined geographic area. To continue the example, the designation parameters associated with a particular hosted 606 AIS region may correspond to certain defining information associated with the state of Texas. Likewise, the designation parameters associated with a first and second private 626 AIS region may respectively correspond to certain defining information associated with Dallas and Harris counties, both of which are located in the state of Texas. In this example, the hosted 606 AIS region may be implemented to provide various cognitive insights related to the state government of Texas to various county governments. Likewise, the first and second private 626 AIS regions may be respectively implemented to provide cognitive insights specific to the county governments of Dallas and Harris counties.

As another example, the designation parameters associated with a hosted 606 or private 626 AIS region, individually or in combination, may to correspond to various aspects of an organization. To continue the example, the designation parameters associated with a particular hosted 606 AIS region may correspond to certain defining information associated with an automobile dealer network. Likewise, the designation parameters associated with a first and second private 626 AIS region may respectively correspond to certain defining information associated with two independent automobile dealers, both of which are located in the same city and sell the same brand of automobiles. In this example, the hosted 606 AIS region may be implemented to provide various cognitive insights related to certain aspects of the automobile brand. Likewise, the first and second private 626 AIS regions may be respectively implemented to provide cognitive insights specific to certain aspects of the two automobile dealers, such as their respective inventories, customer demographics, and past promotional activities.

In certain embodiments, each hosted 606 and private 626 AIS regions may be implemented to include one hosted 608 or private 628 AIS environments. As used herein, a hosted 608 AIS environment broadly refers to an operating environment within which a particular hosted 608 AIS environment is implemented. As likewise used herein, a private hosted 628 AIS environment broadly refers to an operating environment within which a particular private 628 AIS environment is implemented.

As an example, a cognitive process may first be implemented in a hosted 608 or private 628 development environment to generate a cognitive process by orchestrating certain cognitive agents, as described in greater detail herein. Once development has been completed, the resulting cognitive process may be promoted to a hosted 608 or private 628 test environment. Thereafter, once testing of the cognitive process has been completed, it may be promoted to a hosted 608 or private 628 user acceptance environment. Likewise, once the user acceptance phase has been completed, it may be promoted to a hosted 608 or private 628 production environment.

In certain embodiments, each hosted 608 and private 628 AIS environments may be implemented to include they use of one or more hosted 610 or private 630 cognitive agents, described in greater detail herein, to generate cognitive insights, likewise described in greater detail herein. In certain embodiments, a gateway/load balancer 644 may be implemented to allow the hosted 604 and private 624 AIS platforms to communicate with one another. In certain embodiments, the ability to communicate with one another allows the hosted 604 and private 624 AIS platforms to work collaboratively when generating cognitive insights described in greater detail herein.

Figure 7:
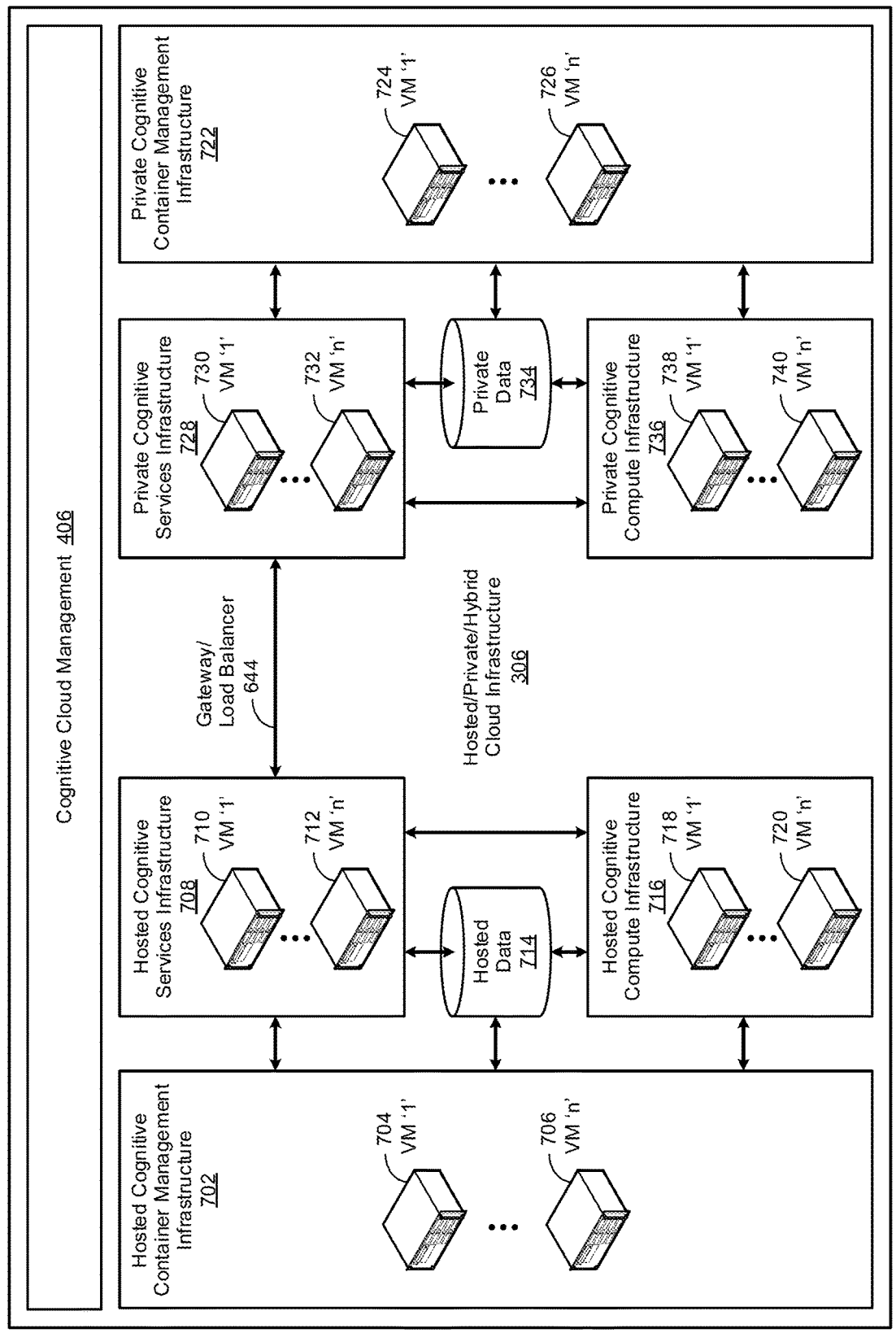
FIG. 7 shows components of a plurality of AIS platforms implemented within a hosted/private/hybrid cloud environment.

FIG. 7 shows components of a plurality of augmented intelligence system (AIS) platforms implemented in accordance with an embodiment of the invention within a hosted/private/hybrid cloud environment. In certain embodiments, the hybrid cloud infrastructure 304 may be implemented to include a cognitive cloud management 406 platform, a hosted 702 cognitive container management infrastructures, and a private 722 cognitive container management infrastructure. In certain embodiments, the hosted 702 and private 722 cognitive container management infrastructures may be implemented to respective include one or more virtual machines (VMs) '1' 704 through 'n' 706 and VMs '1 724 through 'n' 726**.

In certain embodiments, the hybrid cloud infrastructure 304 may likewise be implemented to include hosted 708 and private 728 cognitive services infrastructures, hosted 716 and private 736 cognitive compute infrastructures, and a gateway/load balancer 644. In certain embodiments, the hosted 708 and private 728 cognitive services infrastructures may be implemented to respective include one or more virtual machines (VMs) '1' 710 through 'n' 712 and VMs '1 730 through 'n' 732. In certain embodiments, the hosted 716 and private 736 cognitive compute infrastructures may likewise be implemented to respective include one or more virtual machines (VMs) '1' 718 through 'n' 720 and VMs '1 738 through 'n' 740.

Likewise, in certain embodiments the hybrid cloud infrastructure 304 may be implemented to include various repositories of hosted 714 and private 734 data. As used herein, a repository of hosted 714 or private 734 data broadly refers to a collection of knowledge elements that can be used in certain embodiments to generate one or more cognitive insights, described in greater detail herein. In certain embodiments, these knowledge elements may include facts (e.g., milk is a dairy product), information (e.g., an answer to a question), descriptions (e.g., the color of an automobile), abilities (e.g., the knowledge of how to install plumbing fixtures), and other classes of knowledge familiar to those of skill in the art. In these embodiments, the knowledge elements may be explicit or implicit. As an example, the fact that water freezes at zero degrees centigrade is an explicit knowledge element, while the fact that an automobile mechanic knows how to repair an automobile is an implicit knowledge element.

In certain embodiments, the knowledge elements within a repository of hosted 714 or private 734 data may also include statements, assertions, beliefs, perceptions, preferences, sentiments, attitudes or opinions associated with a person or a group. As an example, user 'A' may prefer the pizza served by a first restaurant, while user 'B' may prefer the pizza served by a second restaurant. Furthermore, both user 'A' and 'B' are firmly of the opinion that the first and second restaurants respectively serve the very best pizza available. In this example, the respective preferences and opinions of users 'A' and 'B' regarding the first and second restaurant may be included in a universal knowledge repository as they are not contradictory. Instead, they are simply knowledge elements respectively associated with the two users and can be used in various embodiments for the generation of certain cognitive insights, as described in greater detail herein.

In certain embodiments, individual knowledge elements respectively associated with the repositories of hosted 714 and private 734 data may be distributed. In certain embodiments, the distributed knowledge elements may be stored in a plurality of data stores familiar to skilled practitioners of the art. In certain embodiments, distributed knowledge elements may be logically unified for various implementations of the repositories of hosted 714 and private 734 data.

In certain embodiments, the repositories of hosted 714 and private 734 data may be respectively implemented in the form of a hosted or private universal cognitive graph, described in greater detail herein. In certain embodiments, individual nodes within a hosted or private universal cognitive graph may contain one or more knowledge elements. In certain embodiments, the repositories of hosted 714 and private 734 data may be respectively implemented to include a repository of hosted and private AIS components, such as the AIS component repository 402 shown in FIG. 4 and described in its associated descriptive text.

In certain embodiments, the repositories of hosted 714 and private 734 data may respectively include one or more repositories of application data, proprietary data, and proprietary transaction data. In certain embodiments, the repositories of hosted or private transaction data may include credit or debit card transaction data, financial services data of all kinds (e.g., mortgages, insurance policies, stock transfers, etc.), purchase order data, invoice data, shipping data, receipt data, or any combination thereof. In various embodiments, the repositories of hosted or private transaction data may likewise include blockchain-associated data, smart contract data, or any combination thereof.

In certain embodiments, hosted and private transaction data may be exchanged through the implementation of a transaction data exchange implemented on the gateway/load balancer 644. In certain embodiments, the implementation of such a transaction data exchange may allow the hosted 716 cognitive compute infrastructure to access certain private transaction data. Conversely, the private 736 cognitive compute infrastructure may be allowed to access certain hosted transaction data. In certain embodiments, the transaction data exchange may be implemented with permission and identity management controls to determine the degree to which certain hosted and private transaction data may be respectively accessed by the hosted 716 and private 736 cognitive compute infrastructures.

In certain embodiments, the repositories of hosted or private transaction data may include data associated with a public blockchain. As used herein, a public blockchain broadly refers to a blockchain that has been implemented as a permissionless blockchain, meaning anyone can read or write to it. One advantage of such a public blockchain is it allows individuals who do not know each other to trust a shared record of events without the involvement of an intermediary or third party.

In certain embodiments, a repository of private transaction data may implemented to include data associated with a proprietary blockchain. As likewise used herein, a proprietary blockchain broadly refers to a blockchain where its participants are known and are granted read and write permissions by an authority that governs the use of the blockchain. For example, proprietary blockchain participants may belong to the same or different organizations within an industry sector. In certain embodiments, these relationships may be governed by informal relationships, formal contracts, or confidentiality agreements.

Skilled practitioners of the art will recognize that while many transactions may benefit from the decentralized approach typically implemented by a public blockchain, others are more suited to being handled by an intermediary. Such intermediaries, while possibly adding additional complexities and regulation, can often provide demonstrable value. In certain embodiments, an intermediary associated with a proprietary blockchain may have the ability to veto or rescind suspect transactions, provide guarantees and indemnities, and deliver various services not generally available through a public blockchain.

Furthermore, proprietary blockchains have several advantages, including the use of cryptographic approaches known to those of skill in the art for identity management and verification of transactions. These approaches not only prevent the same transaction taking place twice, such as double-spending a digital currency, they also provide protection against malicious activities intended to compromise a transaction by changing its details. Moreover, permission controls typically associated with proprietary blockchains can provide dynamic control over who can connect, send, receive and enact individual transactions, based upon any number of parameters that may not be available or implementable in public blockchains. Accordingly, full control can be asserted over every aspect of a proprietary blockchain's operation, not only in accordance with the consensus of its various participants, but its administrative intermediary as well.

In certain embodiments, the hosted 708 or private 728 cognitive services infrastructure may be implemented to manage the identity of a user, group or organization in the performance of blockchain-associated cognitive insight operations. In certain embodiments, the hosted 708 or private 728 cognitive services infrastructure may be implemented to perform various cognitive identity management operations. In certain embodiments, the cognitive identity management operations may include the use of cognitive personas, cognitive profiles, or a combination thereof, to perform blockchain-associated cognitive insight operations associated with a particular user, group or organization. In certain embodiments, the cognitive identity management operations may be implemented to verify the identity of a user, group or organization in the performance of a blockchain-associated cognitive insight operation.

In certain embodiments, the cognitive identity management operations may likewise involve the generation, and ongoing management of, private keys, shared keys, public/private key pairs, digital signatures, digital certificates, or any combination thereof, associated with a particular user, group or organization. Likewise, in certain embodiments the cognitive identity management operations may involve the encryption of one or more cognitive insights, one or more smart contracts, or some combination thereof, during the generation of a blockchain-associated cognitive insight. Those of skill in the art will recognize that many such embodiments are possible. Accordingly, the foregoing is not intended to limit the spirit, scope or intent of the invention.

In various embodiments, the gateway/load balancer 644 may be implemented for the hosted 708 cognitive services infrastructure provide certain hosted data and knowledge elements to the private 728 cognitive services infrastructure, In certain embodiments, the provision of certain hosted data and knowledge elements allows the hosted 714 repository of data to be replicated as the private 724 repository of data. In certain embodiments, the provision of certain hosted data and knowledge elements to the private 728 cognitive services infrastructure allows the hosted 714 repository of data to provide updates to the private 734 repository of data. In certain embodiments, the updates to the private 734 repository of data do not overwrite other data. Instead, the updates are simply added to the private 734 repository of data.

In certain embodiments, knowledge elements and data that are added to the private 734 repository of data are not respectively provided to the hosted 714 repository of data. As an example, an airline may not wish to share private information related to its customer's flights, the price paid for tickets, their awards program status, and so forth. In various embodiments, certain knowledge elements and data that are added to the private 724 repository of data may be provided to the hosted 714 repository of data. As an example, the owner of the private 734 repository of data may decide to license certain knowledge elements and data to the owner of the hosted 714 repository of data. To continue the example, certain knowledge elements or data stored in the private 734 repository of data may be anonymized prior to being provided for inclusion in the hosted 714 repository of data.

In certain embodiments, only private knowledge elements or data are stored in the private 734 repository of data. In certain embodiments, the private 736 cognitive compute infrastructure may use knowledge elements and data stored in both the hosted 714 and private 734 repositories of data to generate cognitive insights. Skilled practitioners of the art will recognize that many such embodiments are possible. Accordingly, the foregoing is not intended to limit the spirit, scope or intent of the invention.

Figure 8A:
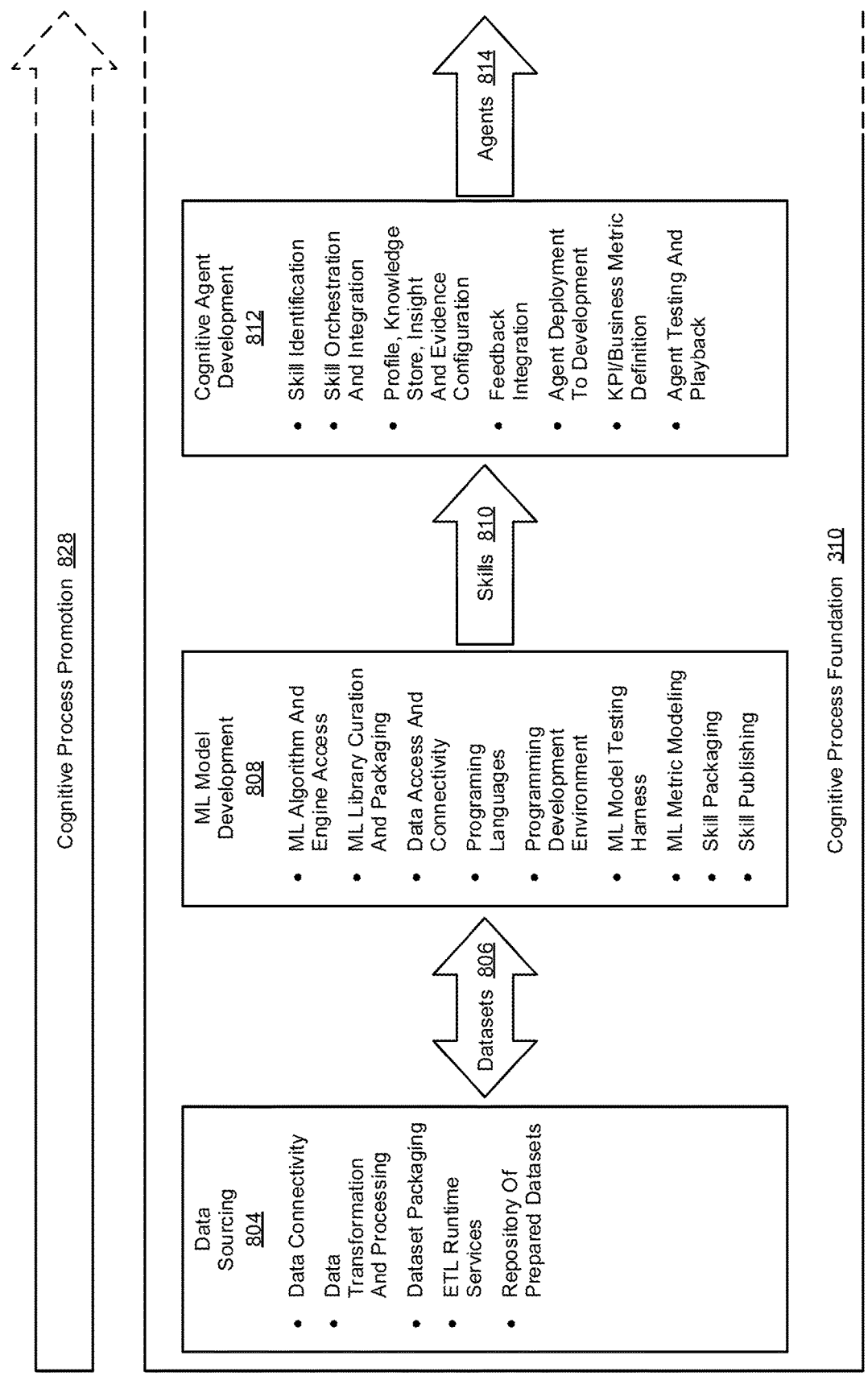
FIGS. 8a and 8b are a simplified process diagram showing the performance of cognitive process promotion operations.
Figure 8B:
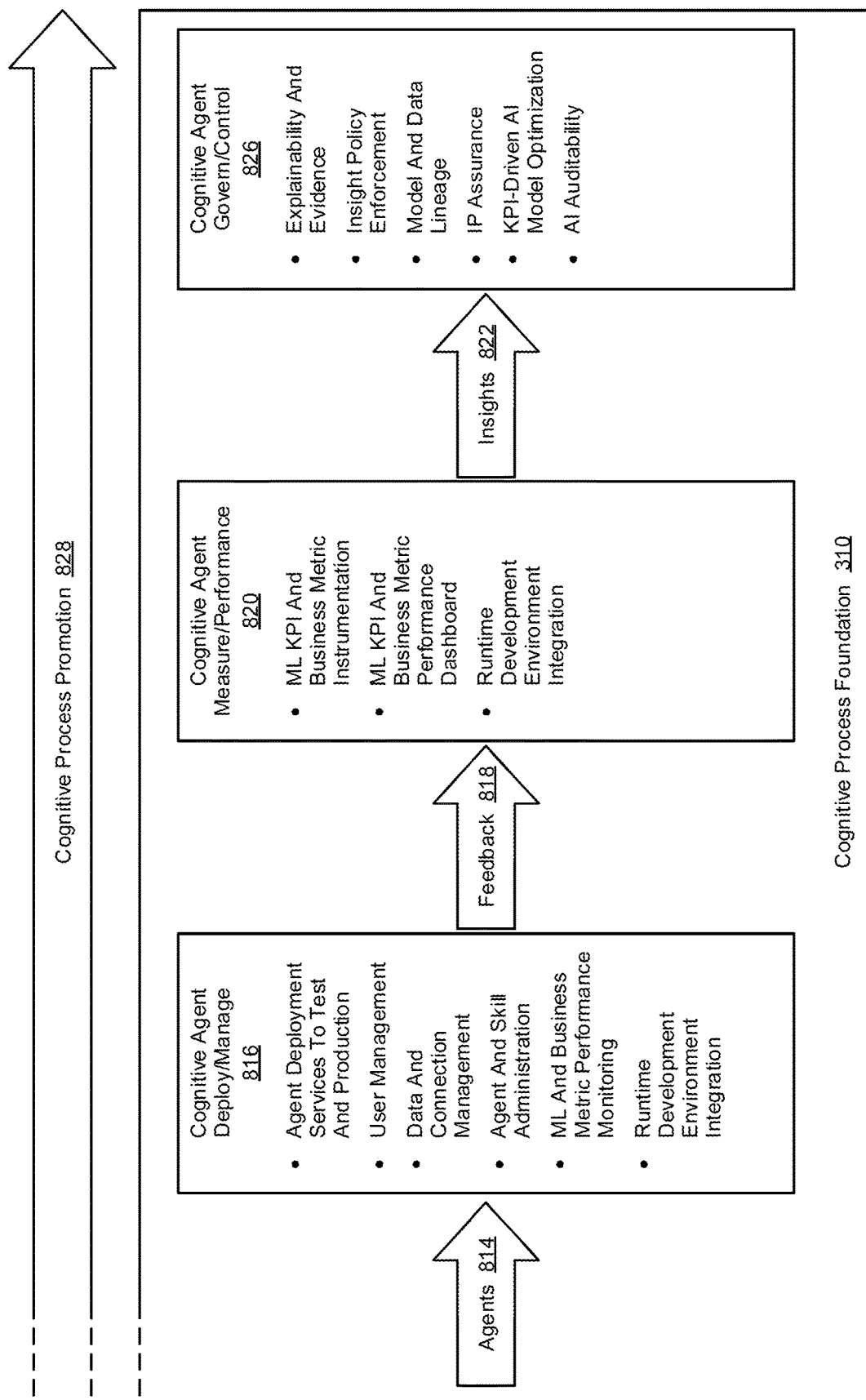

FIGS. 8*a* and 8*b* are a simplified process diagram showing the performance of cognitive process promotion operations implemented in accordance with an embodiment of the invention. In various embodiments, a cognitive process foundation 310, described in greater detail herein, may be implemented to perform certain cognitive process promotion 828 operations associated with promoting a particular cognitive process from one operating environment to another.

As shown in FIG. 8*a*, certain operations may be performed in a data sourcing 804 phase, which results in the generation various data sets 806, which are then used in a machine learning (ML) model development 808 phase. In turn, the resulting ML model may be incorporated into one or more cognitive skills 810, which are then used in a cognitive agent development 812 phase to generate various cognitive agents 814.

The resulting cognitive agents 814, as shown in FIG. 8*b*, may then be implemented in a cognitive agent deployment and management 816 phase, which results in certain feedback 818. In turn, the feedback 818 may be used in a cognitive agent measurement and performance 820 phase, which results in the generation of various cognitive insights 822. The resulting cognitive insights 826 may then be used in a cognitive agent governance and control phase 826.

Figure 9:
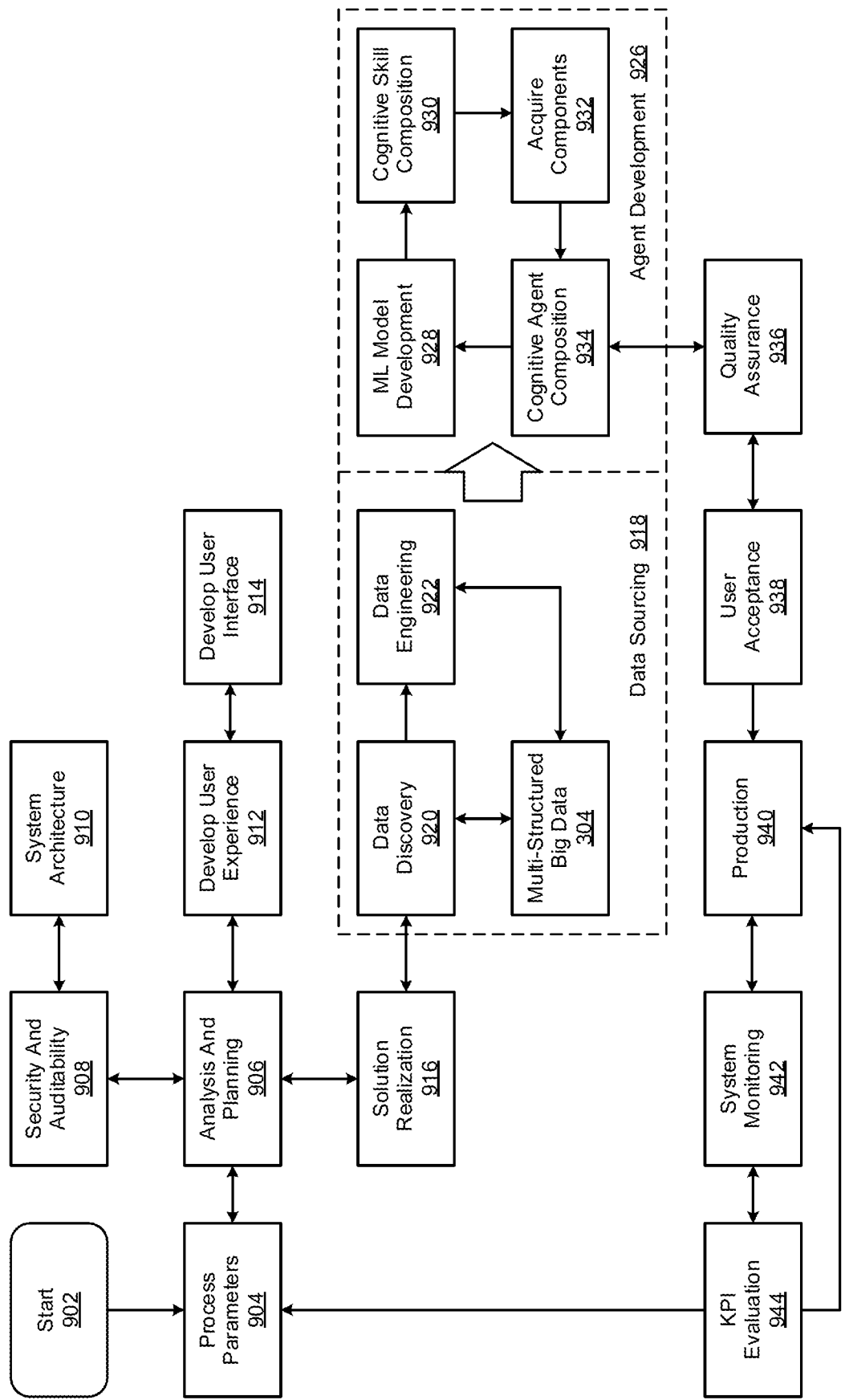
FIG. 9 is a simplified process diagram showing phases of a cognitive process lifecycle.

FIG. 9 is a simplified process diagram showing phases of a cognitive process lifecycle implemented in accordance with an embodiment of the invention. As used herein, a cognitive process lifecycle broadly refers to a series of phases, or individual operational steps, or a combination thereof, associated with a cognitive process, spanning its inception, development, implementation, testing, acceptance, production, revision, and eventual retirement. In certain embodiments, each phase or operational step of a cognitive process lifecycle may have associated input artifacts, roles or actors, and output artifacts.

As used herein, an input artifact broadly refers to an article of information used to perform an operation associated with completion of a certain phase, or performance of certain operational steps, of a cognitive process lifecycle. Examples of input artifacts include articles of information related to business and technical ideas, goals, needs, structures, processes, and requests. Other examples of input artifacts include articles of information related to market and technical constraints, system architectures, and use cases. Yet other examples of input artifacts include articles of information related to data sources, previously-developed technology components, and algorithms.

As likewise used herein, a role or actor broadly refers to a particular user, or certain functions they may perform, participating in certain phases or operational steps of a cognitive process lifecycle. Examples of roles or actors include business owners, analysts, and partners, user experience (UX) and user interface (UI) designers, and project managers, as well as solution, enterprise and business process architects, Other examples of roles or actors include data scientists, machine learning (ML) engineers, data, integration and software engineers, as well as system administrators.

An output artifact, as likewise used herein, broadly refers to an article of information resulting from the completion of a certain phase, or performance of certain operational steps, of a cognitive process lifecycle. Examples of output artifacts include Strength/Weaknesses/Opportunity/Threat (SWOT) analysis results, Key Performance Indicator (KPI) definitions, and project plans. Other examples of output artifacts include use case models and documents, cognitive application UX and UI designs, and project plans. Yet other examples of output artifacts include dataset, algorithm, machine learning (ML) model, cognitive skill, and cognitive agent specifications, as well as their corresponding datasets, algorithms, ML models, cognitive skills, and cognitive agents. Those of skill in the art will recognize that many examples of input artifacts, roles or actors, and output artifacts are possible. Accordingly, the foregoing is not intended to limit the spirit, scope or intent of the invention.

In this embodiment, a cognitive process lifecycle is begun in step 902, followed by determining certain operational and performance parameters related to an associated cognitive process in step 904. The resulting operational and performance parameters are then used in step 906 for use in various business analysis and planning purposes, described in greater detail herein. Information security and audibility issues associated with the cognitive process are then identified and addressed in step 908, followed by reviews of the existing system and cognitive architecture, and any resulting updates, being performed in step 910. Likewise, the user experience (UX) and one or more user interfaces (UIs) associated with the cognitive process are respectively developed in steps 912 and 914.

Thereafter, solution realization operations, described in greater detail herein, are performed in step 916 to identify requirements and generate specifications associated with data sourcing 918 and cognitive agent development 926 phases of the cognitive process lifecycle. Once solution realization operations are completed in step 916, data sourcing 918 operations are begun in step 920 with the performance of various data discovery operations, described in greater detail herein. In certain embodiments, the data discovery operations may be performed by accessing various multi-structured, big data 304 sources, likewise described in greater detail herein. Once the data discovery operations have been completed, then certain data engineering operations are performed in step 922 to prepare the sourced data for use in the cognitive agent development 926 phase. In various embodiments, the data engineering operations may be performed on certain of the multi-structured, big data 304 sources.

Once the data sourcing 918 phase has been completed, the cognitive agent development 926 phase is begun in step 928 with development of one or more machine learning (ML) models associated with the cognitive process. Any cognitive skills associated with the cognitive process that may not currently exist are composed in step 930. In certain embodiments, an ML model developed in step 928 may be used to compose a cognitive skill in step 930. Associated cognitive process components are then acquired in step 932 and used in step 934 to compose a cognitive agent. The foregoing steps in the cognitive agent development 926 phase are then iteratively repeated until all needed cognitive agents have been developed.

Once the cognitive agent development 926 phase has been completed, quality assurance and user acceptance operations associated with the cognitive process are respectively performed in step 936 and 938. The cognitive process is then promoted, as described in greater detail herein, into a production phase in step 940. Once the cognitive process is operating in a production phase, ongoing system monitoring operations are performed in step 942 to collect certain performance data. The performance data resulting from the monitoring operations performed in step 942 is then used in step 944 to perform various Key Performance Indicator (KPI) evaluation operations.

In turn, the results of the KPI evaluations are then used as feedback to improve the performance of the cognitive process. In certain embodiments, the results of the KPI evaluations may be provided as input in step 904 to determine additional operational and performance parameters related to the cognitive process. In certain embodiments, these additional operational and performance parameters may be used to repeat one or more steps associated with the lifecycle of the cognitive process to revise its functionality, improve its performance, or both.

Figure 10A:
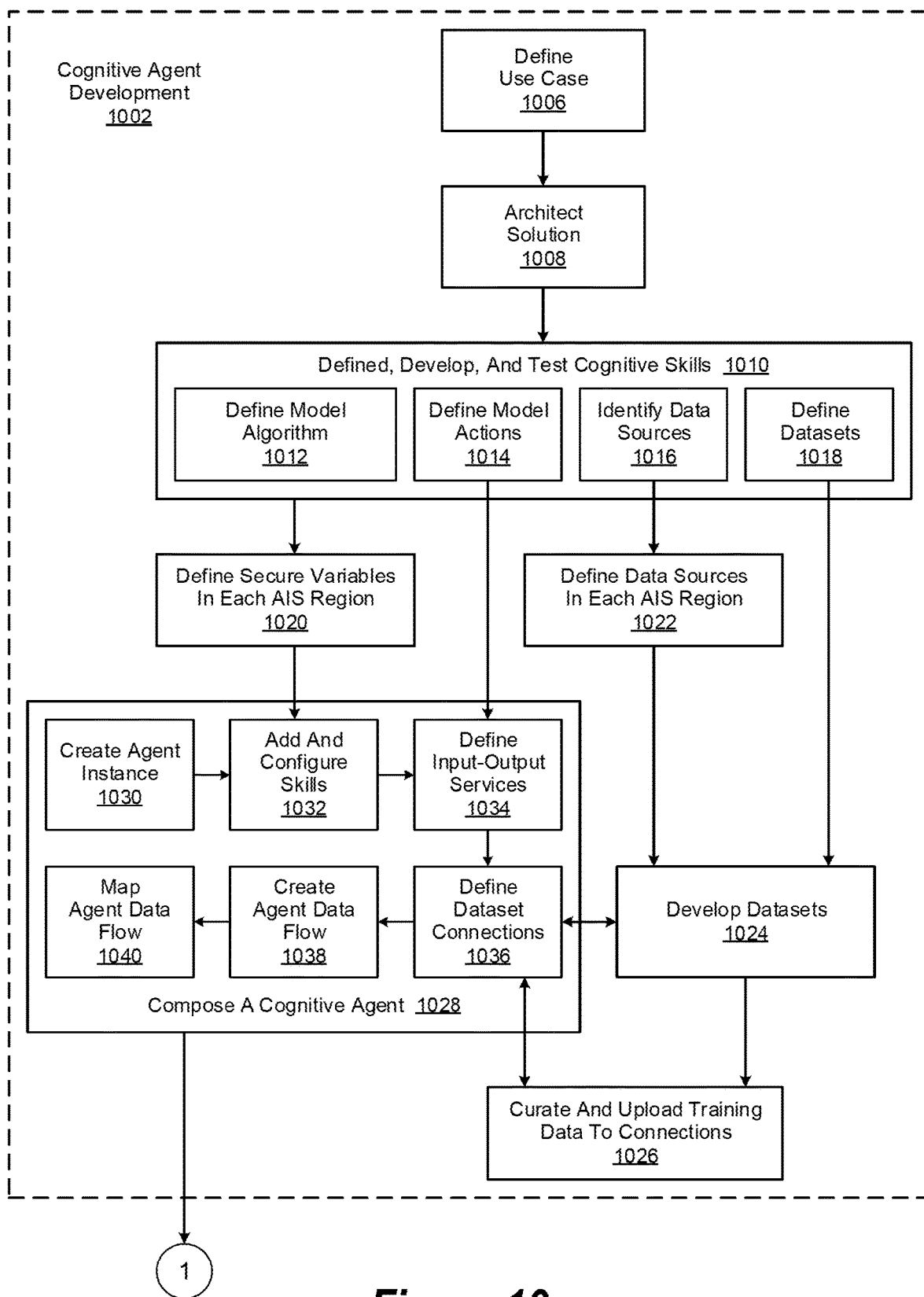
FIGS. 10a and 10b are a simplified process flow showing the lifecycle of augmented intelligence agents implemented to perform AIS operations.
Figure 10B:
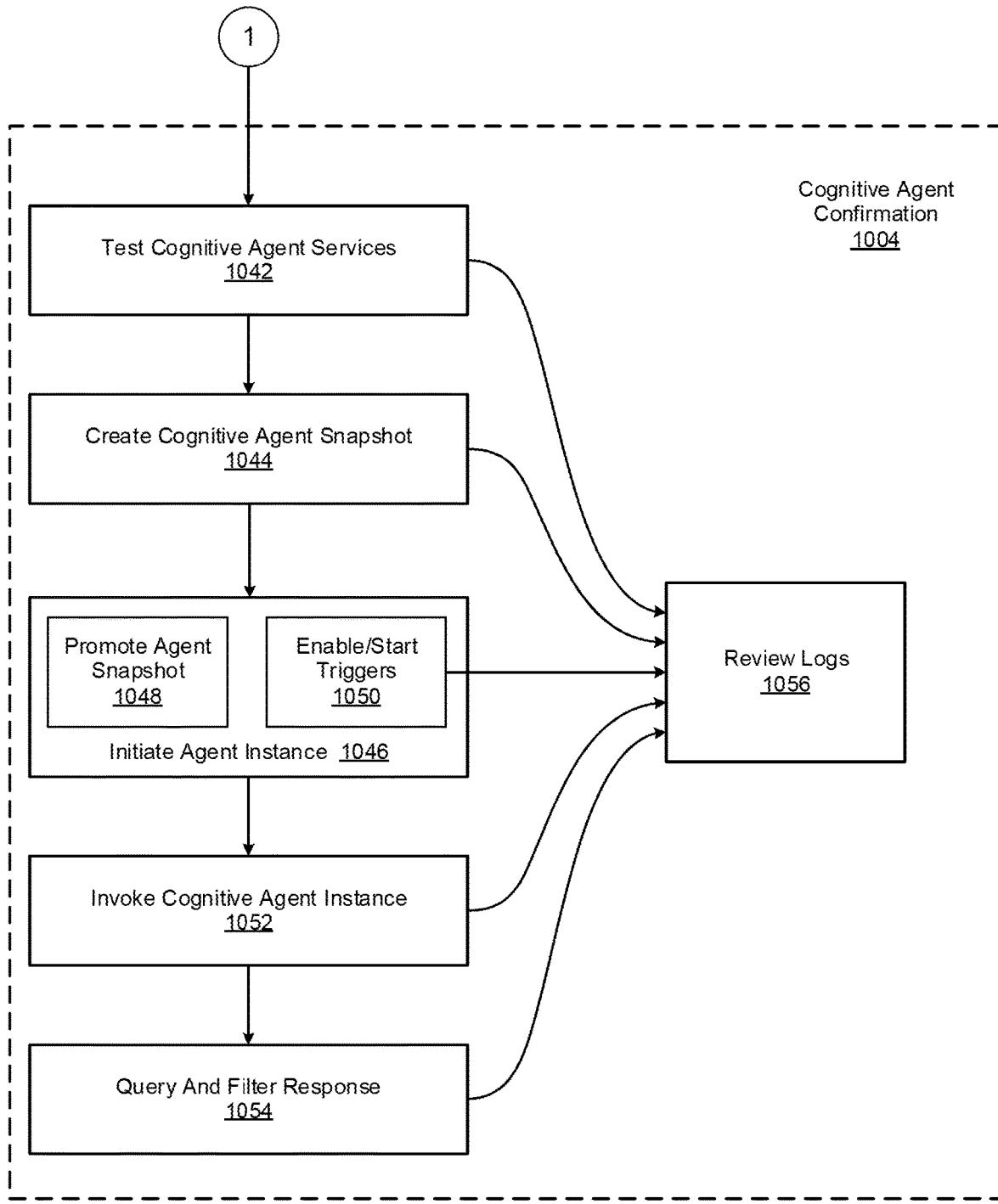

FIGS. 10a and 10b are a simplified process flow showing the lifecycle of augmented intelligence agents implemented in accordance with an embodiment of the invention to perform augmented intelligence system (AIS) operations. In certain embodiments, a cognitive agent lifecycle may include a cognitive agent development 1002 phase and a cognitive agent confirmation 1004 phase. In certain embodiments, the cognitive agent development 1002 phase may be initiated with the definition of a cognitive process use case in step 1006, followed by architecting an associated solution in step 1008.

One or more cognitive skills associated with the architected solution are then defined, developed and tested in step 1010. In certain embodiments, a machine learning (ML) model associated with the architected solution is defined in step 1012. In certain embodiment, cognitive actions, described in greater detail herein, are defined for the ML model in step 1014. In certain embodiments, data sources for the architected solution are identified in step 1016 and corresponding datasets are defined in step 1018.

The ML model definitions defined in step 1012 are then used in step 1020 to define variables that need to be secured in the implementation of each associated AIS region, described in greater detail herein. Likewise, the data sources identified in step 1016 are used in step 1022 to define data sources corresponding to each associated AIS region. Thereafter, the data sources defined in step 1022 and the datasets defined in step 1018 are used in step 1024 to define datasets that will be used to compose a cognitive agent in step 1028. Once the datasets have been developed in in step 1024, they are used to curate and upload training data to associated data source connections in step 1026.

Cognitive agent compositions operations are then initiated in step 1028 by creating a cognitive agent instance in step 1030. Once created, the secured variables defined in step 1020 are added to one or more cognitive skills, which in turn are configured in step 1032. The ML model actions defined in step 1014 are then used in step 1034 to define input and output services for the one or more cognitive skills configured in step 1032. Thereafter, the datasets developed in step 1024 are used in step 1036, along with the training data curated and uploaded in step 1026 to define dataset connections. A dataflow is then created for the cognitive agent in step 1038 and mapped in step 1040.

The cognitive agent confirmation 1004 phase is then initiated in step 1042 by testing various service associated with the cognitive agent composed in step 1028. Thereafter, a cognitive agent snapshot, described in greater detail herein, is then created in step 1044. In certain embodiments, the cognitive agent snapshot may include versioning and other descriptive information associated with the cognitive agent.

An instance of the cognitive agent is then initiated in step 1046. In certain embodiments, initiation of the cognitive agent may include promoting a snapshot of the cognitive agent in step 1048 and enabling start and stop triggers in step 1050. The instance of the cognitive agent that was initiated in step 1046 is then invoked for execution in step 1052, followed by performing queries and filtering associated responses in step 1054. In certain embodiments, log entries corresponding to the operations performed in step 1042 through 1056 are reviewed in step 1056.

Figure 11:
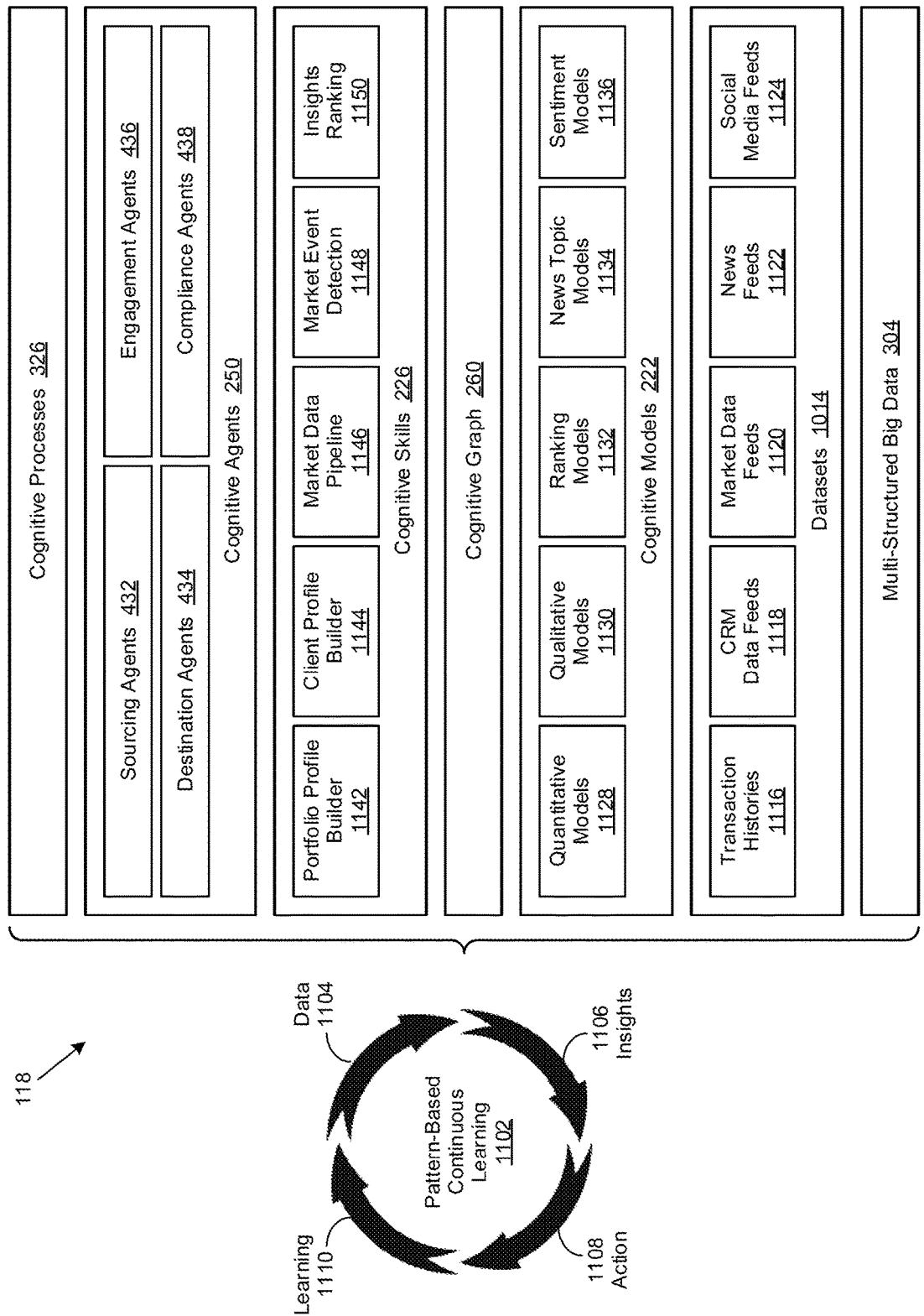
FIG. 11 is a simplified block diagram of an AIS used to perform pattern-based continuous learning operations.

FIG. 11 is a simplified block diagram of an augmented intelligence system (AIS) implemented in accordance with an embodiment of the invention to perform pattern-based continuous learning operations. In certain embodiments, the pattern-based continuous learning operations 1102 may include a data ingestion and processing 1004 phase, followed by the performance of certain cognitive processes, described in greater detail, during a cognitive insights 1106 phase. In certain embodiments, the cognitive insight 1106 phase is followed by a cognitive action 1108 phase, which in turn is followed by a cognitive learning 1110 phase. In certain embodiments, the process is continued, proceeding with the data ingestion and processing 1104 phase.

In certain embodiments, multi-structured big data sources 304 may be dynamically ingested during the data ingestion and processing 1104 phase. In certain embodiments, based upon a particular context, extraction, parsing, and tagging operations are performed on language, text and images they contain to generate associated datasets 1114. In certain embodiments, the resulting datasets may include various transaction histories 1116, customer relationship management (CRM) feeds 1118, market data feeds 1120, news feeds 1122, social media feeds 1124, and so forth.

In certain embodiments automated feature extraction and modeling operations may be performed on the datasets 1114 to generate one or more cognitive models 222, described in greater detail herein. In certain embodiments, the cognitive models 222 may include quantitative 1128 models, qualitative 1130 models, ranking 1132 models, news topic 1134 models, sentiment 1136 models, and so forth, In various embodiments, the resulting cognitive models may be implemented to map certain datasets 1114 to a cognitive graph 260, described in greater detail herein.

In various embodiments, the cognitive models 222 and the datasets 1114 mapped to the cognitive graph 260 may be used in the composition of certain cognitive skills 226, as likewise described in greater detail herein. In certain embodiments, the cognitive skills 226 may include a portfolio profile builder 1142 skill, a client profile builder 1144 skill, a market data pipeline 1146 skill, a market event detection 1148 skill, a cognitive insights ranking 1150 skill, and so forth. As likewise described in greater detail herein, the resulting cognitive skills 226 may then be used in various embodiments to generate certain cognitive agents 250. In certain embodiments, the resulting cognitive agents 250 may include sourcing 432 agents, destination 434 agents, engagement 436 agents, compliance 438 agents, and so forth.

In certain embodiments, the sourcing 432 agent may be implemented to source various multi-structured big data 304 sources, described in greater detail herein. In certain embodiments, the sourcing 432 agent may include a batch upload agent, an Application Program Interface (API) connectors agent, a real-time streams agent, a Structured Query Language (SQL)/Not Only SQL (NoSQL) databases agent, a message engines agent, a transaction sourcing agent, or some combination thereof. Skilled practitioners of the art will recognize that many such examples of sourcing 432 agents are possible. Accordingly, the foregoing is not intended to limit the spirit, scope or intent of the invention.

In certain embodiments, the resulting cognitive agents 250 may be implemented during the cognitive insights 1106 phase, as described in greater detail herein, to perform various cognitive processes 326. In various embodiments, the performance of certain cognitive processes 326 may result in the generation of one or more cognitive insights. In various embodiments, the cognitive insights may include the provision of certain actionable recommendations and notifications to a user during the cognitive action 1108 phase. In various embodiments, certain features from newly-observed data may be automatically extracted from user feedback during the learning 1010 phase to improve various cognitive models 222.

As an example, a first query from a user may be submitted to the AIS 118 system during the cognitive insights 1106 phase, which results in the generation of a first cognitive insight, which is then provided to the user. In response, the user may respond by providing a first response, or perhaps a second query, either of which is provided in the same context as the first query. The AIS 118 receives the first response or second query, performs various AIS 118 operations, and provides the user a second cognitive insight. As before, the user may respond with a second response or a third query, again in the context of the first query. Once again, the AIS 118 performs various AIS 118 operations and provides the user a third cognitive insight, and so forth. In this example, the provision of cognitive insights to the user, and their various associated responses, results in a stateful dialog that evolves over time.

FIG. 12 depicts a screen presentation of a cognitive skill composition platform user interface (UI) implemented in accordance with an embodiment of the invention. As shown in FIG. 12, various aspects of the cognitive skill composition UI 1202 are depicted. More specifically, an Add Cognitive Skill 1204 functionality is shown. In certain embodiments, the Add Cognitive Skill 1204 functionality is used when adding one of more cognitive skills 1206 to a cognitive agent, as described in greater detail herein.

Figure 13:
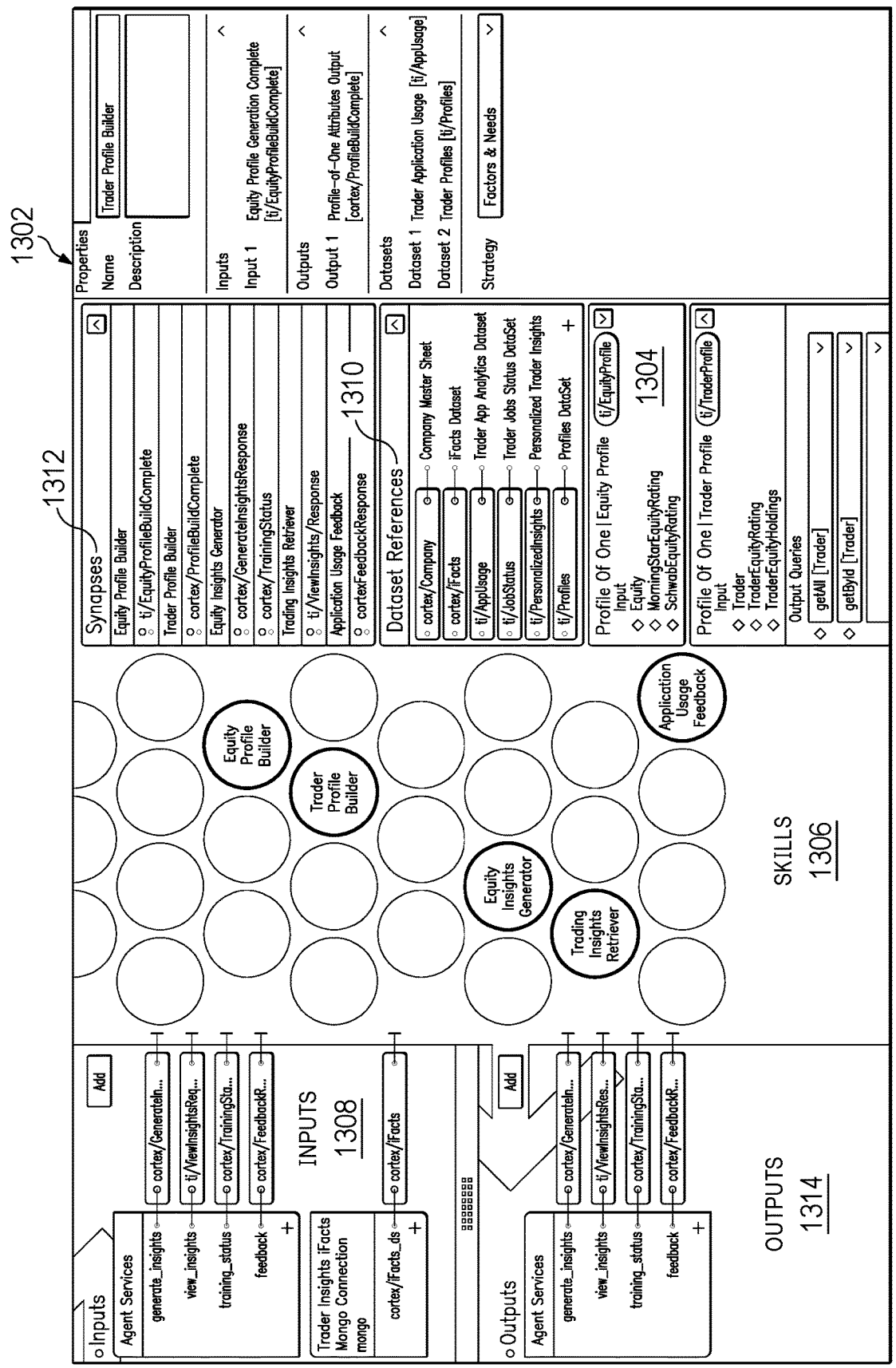
FIGS. 13 and 14 depict screen presentations of a cognitive agent composition platform UI.
Figure 14:
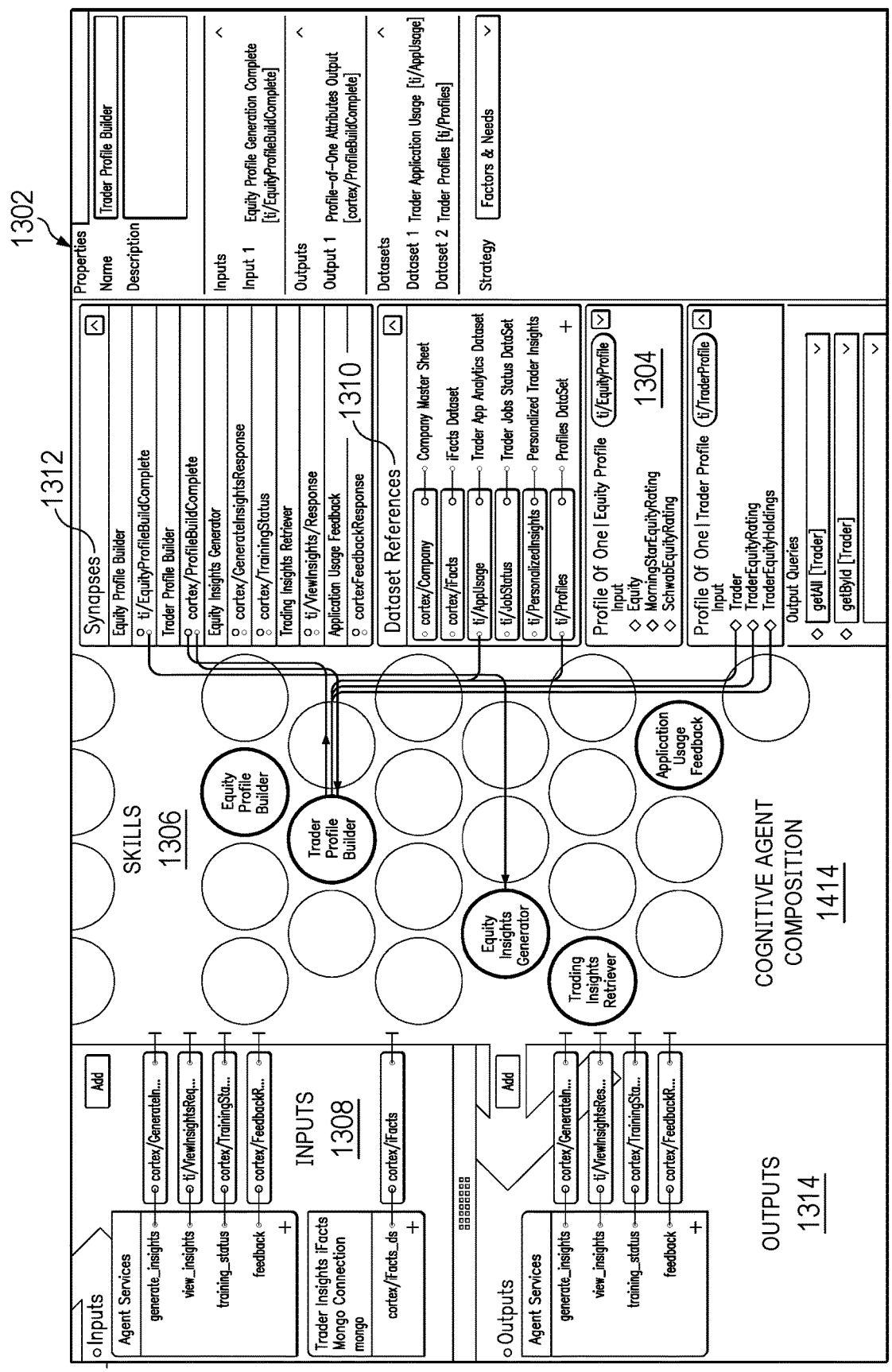

FIGS. 13 and 14 depict screen presentations of a cognitive agent composition platform user interface (UI) implemented in accordance with an embodiment of the invention. In various embodiments, the cognitive agent composition platform UI 1302 may be used when composing cognitive agents 1304 for use by an augmented intelligence system (AIS) in the performance of certain cognitive processes, described in greater detail herein. In certain embodiments, the cognitive agent composition platform UI provides a selection model which represents the operational flow of a cognitive process through an AIS. In certain embodiments, the operational flow represents the flow of data through one or more cognitive agents of the cognitive process and the properties of each cognitive agent 1304. In various embodiments, the cognitive agent composition platform UI may be implemented to include one or more of an input 1408 portion, an output 1314 portion, a cognitive skill 1406 portion, a cognitive agent 1304 portion, a synapses 1312 portion, a dataset references 1310 portion, and a cognitive agent composition 1414 portion.

Figure 15:
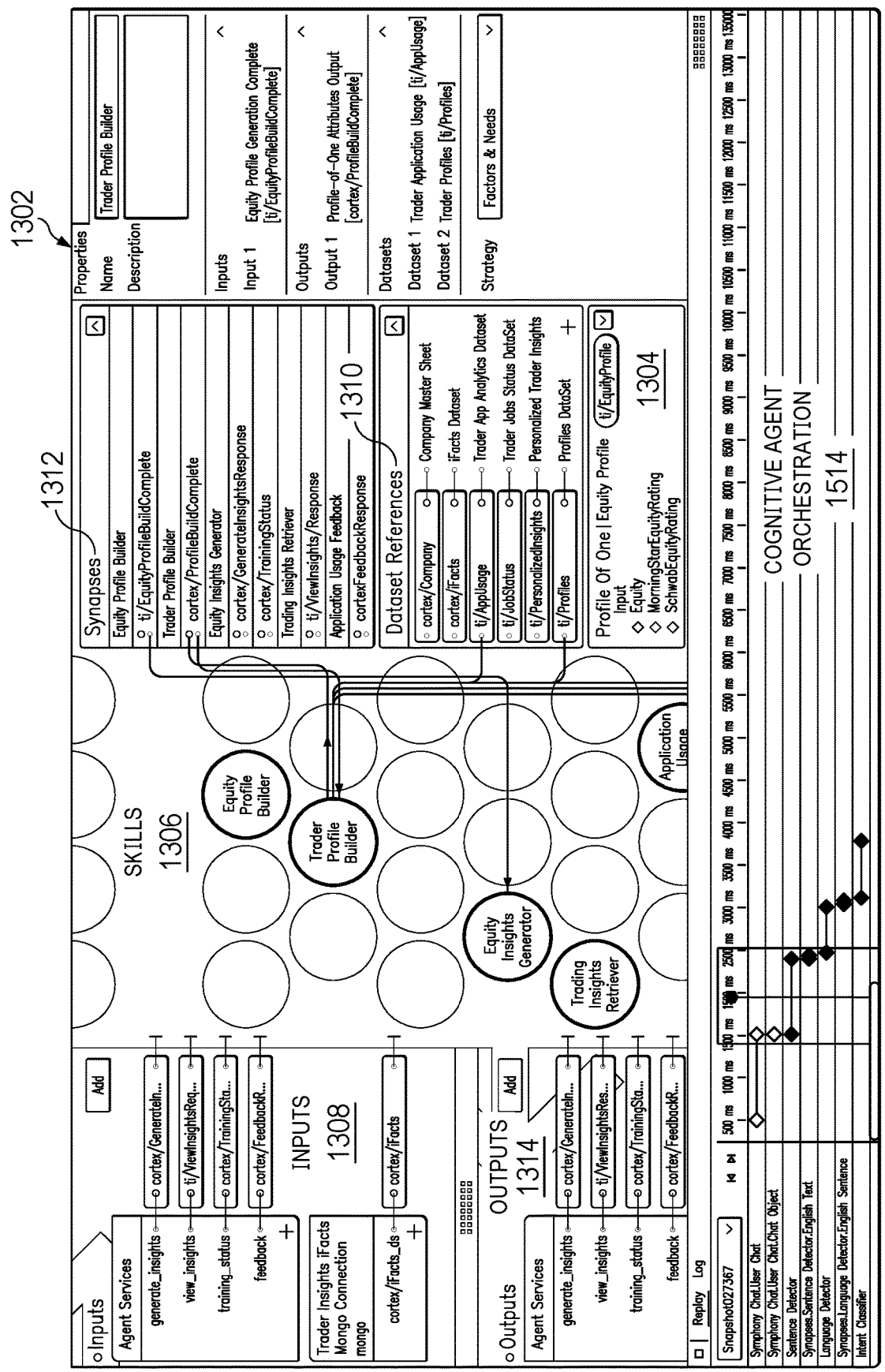
FIG. 15 depicts a screen presentation of another cognitive composition platform UI.

FIG. 15 depicts a screen presentation of another cognitive composition platform user interface (UI) implemented in accordance with an embodiment of the invention. In certain embodiments, the cognitive agent composition platform UI 1302 may be implemented to include cognitive agent orchestration 1514 portion. In certain embodiments, the cognitive agent orchestration 1514 portion may be implemented to provide a representation of the orchestrated operation of each of the cognitive agents 1304 created using the agent composition platform UI 1302. In various embodiments, cognitive agent orchestration 1514 portion of the cognitive agent composition platform UI 1302 is used when orchestrating certain cognitive agents 1304 used by an augmented intelligence system (AIS) in the performance of a cognitive process.

Although the present invention has been described in detail, it should be understood that various changes, substitutions and alterations can be made hereto without departing from the spirit and scope of the invention as defined by the appended claims.

What is claimed is:

1. A computer-implementable method for cognitive information processing, comprising:
   receiving data from a plurality of data sources;
   processing the data from the plurality of data sources to provide cognitively processed insights via a augmented intelligence platform, the augmented intelligence platform executing on a hardware processor of an information processing system, the augmented intelligence platform and the information processing system providing a cognitive computing function, the augmented intelligence platform comprising a cognitive process foundation platform, the cognitive process foundation platform comprising a cognitive composition platform and a cognitive process orchestration platform, the cognitive composition platform being implemented to create custom extensions to the augmented intelligence platform, the cognitive process orchestration platform orchestrating the custom extensions to provide the cognitively processed insights;
   performing a learning operation to iteratively improve the cognitively processed insights over time; and,
   providing the cognitively processed insights to a destination, the destination comprising a cognitive application, the cognitive application enabling a user to interact with the cognitive insights.

2. The method of claim 1, wherein:
   the cognitive composition platform is further implemented for development of a custom cognitive application; and,
   the destination comprises the custom cognitive application.

3. The method of claim 1, wherein:
   the cognitive composition platform comprises a cognitive skill composition platform, the cognitive skill composition platform being implemented for development of a custom cognitive skill, the custom cognitive skill being purpose-built via the cognitive skill composition platform.

4. The method of claim 1, wherein:
   the cognitive composition platform comprises a cognitive agent composition platform, the cognitive agent composition platform being implemented development of a custom cognitive agent, the custom cognitive agent being purpose-built via the cognitive skill composition platform.

5. The method of claim 4, wherein:
   the custom cognitive agent comprises at least one of a sourcing agent, a destination agent, an engagement agent and a compliance agent.

6. The method of claim 4, wherein:
   the cognitive process orchestration platform orchestrates the custom cognitive agent to provide the cognitively processed insights.

7. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations and comprising instructions executable by the processor and configured for:
   receiving data from a plurality of data sources;
   processing the data from the plurality of data sources to provide cognitively processed insights via a augmented intelligence platform, the augmented intelligence platform executing on a hardware processor of an information processing system, the augmented intelligence platform and the information processing system providing a cognitive computing function, the augmented intelligence platform comprising a cognitive process foundation platform, the cognitive process foundation platform comprising a cognitive composition platform and a cognitive process orchestration platform, the cognitive composition platform being implemented to create custom extensions to the augmented intelligence platform, the cognitive process orchestration platform orchestrating the custom extensions to provide the cognitively processed insights;
   performing a learning operation to iteratively improve the cognitively processed insights over time; and,
   providing the cognitively processed insights to a destination, the destination comprising a cognitive application, the cognitive application enabling a user to interact with the cognitive insights.

8. The system of claim 7, wherein:
   the cognitive composition platform is further implemented for development of a custom cognitive application; and,
   the destination comprises the custom cognitive application.

9. The system of claim 7, wherein:
   the cognitive composition platform comprises a cognitive skill composition platform, the cognitive skill composition platform being implemented for development of a custom cognitive skill, the custom cognitive skill being purpose-built via the cognitive skill composition platform.

10. The system of claim 7, wherein:
    the cognitive composition platform comprises a cognitive agent composition platform, the cognitive agent composition platform being implemented development of a custom cognitive agent, the custom cognitive agent being purpose-built via the cognitive skill composition platform.

11. The system of claim 10, wherein:
the custom cognitive agent comprises at least one of a sourcing agent, a destination agent, an engagement agent and a compliance agent.

12. The system of claim 10, wherein:
the cognitive process orchestration platform orchestrates the custom cognitive agent to provide the cognitively processed insights.

13. A non-transitory, computer-readable storage medium embodying computer program code, the computer program code comprising computer executable instructions configured for:
receiving data from a plurality of data sources;
processing the data from the plurality of data sources to provide cognitively processed insights via a augmented intelligence platform, the augmented intelligence platform executing on a hardware processor of an information processing system, the augmented intelligence platform and the information processing system providing a cognitive computing function, the augmented intelligence platform comprising a cognitive process foundation platform, the cognitive process foundation platform comprising a cognitive composition platform and a cognitive process orchestration platform, the cognitive composition platform being implemented to create custom extensions to the augmented intelligence platform, the cognitive process orchestration platform orchestrating the custom extensions to provide the cognitively processed insights;
performing a learning operation to iteratively improve the cognitively processed insights over time; and,
providing the cognitively processed insights to a destination, the destination comprising a cognitive application, the cognitive application enabling a user to interact with the cognitive insights.

14. The non-transitory, computer-readable storage medium of claim 13, wherein:
the cognitive composition platform is further implemented for development of a custom cognitive application; and,
the destination comprises the custom cognitive application, the cognitive composition platform comprises a cognitive skill composition platform, the cognitive skill composition platform being implemented for development of a custom cognitive skill, the custom cognitive skill being purpose-built via the cognitive skill composition platform.

15. The non-transitory, computer-readable storage medium of claim 13, wherein:
the cognitive composition platform comprises a cognitive skill composition platform, the cognitive skill composition platform being implemented for development of a custom cognitive skill, the custom cognitive skill being purpose-built via the cognitive skill composition platform.

16. The non-transitory, computer-readable storage medium of claim 13, wherein:
the cognitive composition platform comprises a cognitive agent composition platform, the cognitive agent composition platform being implemented development of a custom cognitive agent, the custom cognitive agent being purpose-built via the cognitive skill composition platform.

17. The non-transitory, computer-readable storage medium of claim 16, wherein:
the custom cognitive agent comprises at least one of a sourcing agent, a destination agent, an engagement agent and a compliance agent.

18. The non-transitory, computer-readable storage medium of claim 16, wherein:
the cognitive process orchestration platform orchestrates the custom cognitive agent to provide the cognitively processed insights.

19. The non-transitory, computer-readable storage medium of claim 13, wherein:
the computer executable instructions are deployable to a client system from a server system at a remote location.

20. The non-transitory, computer-readable storage medium of claim 13, wherein:
the computer executable instructions are provided by a service provider to a user on an on-demand basis.

* * * * *